United States Patent
Centonza et al.

(10) Patent No.: US 12,507,103 B2
(45) Date of Patent: Dec. 23, 2025

(54) CONFIGURATION OF QoE MEASUREMENTS AND ASSOCIATED MEASUREMENT DURATION TIME SUPPORTING MOBILITY

(71) Applicant: Telefonaktiebolaget LM Ericsson (publ), Stockholm (SE)

(72) Inventors: Angelo Centonza, Torrenueva Costa (ES); Ali Parichehrehteroujeni, Linköping (SE); Filip Barac, Huddinge (SE); Cecilia Eklöf, Täby (SE); Luca Lunardi, Genoa (IT); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 399 days.

(21) Appl. No.: 18/013,949

(22) PCT Filed: Jun. 29, 2021

(86) PCT No.: PCT/SE2021/050644
§ 371 (c)(1),
(2) Date: Dec. 30, 2022

(87) PCT Pub. No.: WO2022/005378
PCT Pub. Date: Jan. 6, 2022

(65) Prior Publication Data
US 2023/0292166 A1    Sep. 14, 2023

Related U.S. Application Data

(60) Provisional application No. 63/048,013, filed on Jul. 3, 2020.

(51) Int. Cl.
*H04W 8/22* (2009.01)
*H04W 24/08* (2009.01)
(Continued)

(52) U.S. Cl.
CPC ............ *H04W 24/10* (2013.01); *H04W 8/22* (2013.01); *H04W 24/08* (2013.01);
(Continued)

(58) Field of Classification Search
CPC . H04B 17/0082–409; H04L 43/02–55; H04W 8/005–30; H04W 24/02–10;
(Continued)

(56) References Cited

U.S. PATENT DOCUMENTS

| 2013/0237157 A1* | 9/2013 | Phan ..................... H04W 24/00 |
| 2019/0021020 A1  | 1/2019 | Kim |
| 2023/0080089 A1* | 3/2023 | Hu ........................ H04W 24/10 |

FOREIGN PATENT DOCUMENTS

| WO | 2019030737 A1 | 2/2019 |
| WO | 2021037921 A1 | 3/2021 |
| WO | 2021098074 A1 | 5/2021 |

OTHER PUBLICATIONS

Author Unknown, "Technical Specification Group Services and System Aspects; Telecommunication management; Quality of Experience (QoE) measurement collection; Control and configuration (Release 16)," Technical Specification 28.405, Version 1.2.0 Mar. 2020, 3GPP Organizational Partners, 55 pages.
(Continued)

*Primary Examiner* — Timothy J Weidner
(74) *Attorney, Agent, or Firm* — Withrow & Terranova, PLLC

(57) ABSTRACT

Systems and methods are disclosed herein that relate to Quality of Experience (QoE) measurement configuration and reporting in a cellular communications system during mobility. In one embodiment, a method performed by a User Equipment (UE) comprises receiving a QoE measurement configuration and a measurement duration time associated to the QoE measurement configuration, starting to perform QoE measurements in accordance with the QoE measure-
(Continued)

ment configuration, starting a measurement duration timer upon starting to perform the QoE measurements, the measurement duration timer being initialized to the measurement duration time associated to the QoE measurement configuration, and continuing to perform the QoE measurements while the measurement duration timer is running. Embodiments related to the method of operation of a RAN node are also disclosed.

18 Claims, 14 Drawing Sheets

(51) Int. Cl.
    *H04W 24/10*     (2009.01)
    *H04W 36/00*     (2009.01)
    *H04W 36/08*     (2009.01)
    *H04W 80/12*     (2009.01)
    *H04W 84/02*     (2009.01)
    *H04W 88/02*     (2009.01)
    *H04W 88/08*     (2009.01)
    *H04W 88/12*     (2009.01)
    *H04W 92/02*     (2009.01)
    *H04W 92/10*     (2009.01)
    *H04W 92/12*     (2009.01)
(52) U.S. Cl.
    CPC ....... *H04W 36/0058* (2018.08); *H04W 36/08* (2013.01); *H04W 80/12* (2013.01); *H04W 84/02* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01)
(58) Field of Classification Search
    CPC ........... H04W 28/02–26; H04W 36/0005–385; H04W 72/02–569; H04W 76/10–50; H04W 80/02–12; H04W 84/005–22; H04W 88/005–188; H04W 92/02–24
    See application file for complete search history.

(56) References Cited

OTHER PUBLICATIONS

Author Unknown, "Technical Specification Group Radio Access Network; Radio Resource Control (RRC); Protocol specification (Release 16)," Technical Specification 25.331, Version 16.0.0, Mar. 2020, 3GPP Organizational Partners, 2,319 pages.

Author Unknown, "Technical Specification Group Services and System Aspects; IP Multimedia Subsystem (IMS); Multimedia Telephony; Media handling and interaction (Release 16)," Technical Specification 26.114, Version 16.5.2, Mar. 2020, 3GPP Organizational Partners, 446 pages.

Author Unknown, "Technical Specification Group Services and System Aspects; Transparent end-to-end Packet-switched Streaming Service (PSS); Progressive Download and Dynamic Adaptive Streaming over http (3GP-DASH) (Release 16)," Technical Specification 26.247, Version 16.2.0, Dec. 2019, 3GPP Organizational Partners, 139 pages.

Author Unknown, "Technical Specification Group Services and System Aspects; Telecommunication management; Quality of Experience (QoE) measurement collection; Control and configuration (Release 16)," Technical Specification 28.405, Version 16.0.0, Jul. 2020, 3GPP Organizational Partners, 16 pages.

Author Unknown, "Technical Specification Group Radio Access Network; Evolved Universal Terrestrial Radio Access (E-UTRA); Radio Resource Control (RRC); Protocol specification (Release 16)," Technical Specification 36.331, Version 16.0.0, Mar. 2020, 3GPP Organizational Partners, 1,048 pages.

Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 832 pages.

Author Unknown, "Technical Specification Group Radio Access Network; NG-RAN; Architecture description (Release 16)," Technical Specification 38.401, Version 16.1.0, Mar. 2020, 3GPP Organizational Partners, 50 pages.

Author Unknown, "Technical Specification Group Radio Access Network; NG-RAN; Xn application protocol (XnAP) (Release 16)," Technical Specification 38.423, Version 16.0.0, Dec. 2019, 3GPP Organizational Partners, 330 pages.

Ericsson, "R2-1711832: Solution enhancement for QoE Measurements," 3GPP TSG RAN WG2 #99bis, Oct. 9-13, 2017, Prague, Czech Republic, 4 pages.

Ericsson, "R2-2004624: QoE measurement collection additions," 3GPP TSG RAN2 Meeting #110, Jun. 1-12, 2020, Electronic Meeting, 80 pages.

Internationl Search Report and Written Opinion for International Patent Application No. PCT/SE2021/050644, mailed Sep. 28, 2021, 16 pages.

* cited by examiner

CONFIGURATION OF QoE MEASUREMENTS AND ASSOCIATED MEASUREMENT DURATION TIME SUPPORTING MOBILITY

RELATED APPLICATIONS

This application is a 35 U.S.C. § 371 national phase filing of International Application No. PCT/SE2021/050644, filed Jun. 29, 2021, which claims the benefit of provisional patent application Ser. No. 63/048,013, filed Jul. 3, 2020, the disclosures of which are hereby incorporated herein by reference in their entireties.

TECHNICAL FIELD

The present disclosure relates to Quality of Experience (QoE) measurement configuration and reporting in a cellular communications system.

BACKGROUND

The overall architecture of the Next Generation Radio Access Network (NG-RAN) is described in Third Generation Partnership Project (3GPP) Technical Specification (TS) 38.401 V16.1.0, Section 6.1.1, which is reproduced below.

Start 3GPP TS 38.401 V16.1.0, Section 6.1.1

6.1.1 Overall Architecture of NG-RAN

Reproduced Herein as FIG. 1

FIGS. 6.1-1: Overall Architecture

The NG-RAN consists of a set of gNBs connected to the 5GC through the NG interface.
  NOTE: As specified in 38.300 [2], NG-RAN could also consists of a set of ng-eNBs, an ng-eNB may consist of an ng-eNB-CU and one or more ng-eNB-DU(s). An ng-eNB-CU and an ng-eNB-DU is connected via W1 interface. The general principle described in this section also applies to ng-eNB and W1 interface, if not explicitly specified otherwise.
An gNB can support FDD mode, TDD mode or dual mode operation.
gNBs can be interconnected through the Xn interface.
A gNB may consist of a gNB-CU and one or more gNB-DU(s). A gNB-CU and a gNB-DU is connected via F1 interface.
One gNB-DU is connected to only one gNB-CU.
  NOTE: In case of network sharing with multiple cell ID broadcast, each Cell Identity associated with a subset of PLMNs corresponds to a gNB-DU and the gNB-CU it is connected to, i.e. the corresponding gNB-DUs share the same physical layer cell resources.
  NOTE: For resiliency, a gNB-DU may be connected to multiple gNB-CUs by appropriate implementation.
NG, Xn and F1 are logical interfaces.
For NG-RAN, the NG and Xn-C interfaces for a gNB consisting of a gNB-CU and gNB-DUs, terminate in the gNB-CU. For EN-DC, the S1-U and X2-C interfaces for a gNB consisting of a gNB-CU and gNB-DUs, terminate in the gNB-CU. The gNB-CU and connected gNB-DUs are only visible to other gNBs and the 5GC as a gNB. A possible deployment scenario is described in Annex A.
The node hosting user plane part of NR PDCP (e.g. gNB-CU, gNB-CU-UP, and for EN-DC, MeNB or SgNB depending on the bearer split) shall perform user inactivity monitoring and further informs its inactivity or (re)activation to the node having C-plane connection towards the core network (e.g. over E1, X2). The node hosting NR RLC (e.g. gNB-DU) may perform user inactivity monitoring and further inform its inactivity or (re)activation to the node hosting control plane, e.g. gNB-CU or gNB-CU-CP.
UL PDCP configuration (i.e. how the UE uses the UL at the assisting node) is indicated via X2-C (for EN-DC), Xn-C (for NG-RAN) and F1-C. Radio Link Outage/Resume for DL and/or UL is indicated via X2-U (for EN-DC), Xn-U (for NG-RAN) and F1-U.
The NG-RAN is layered into a Radio Network Layer (RNL) and a Transport Network Layer (TNL).
The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport, signalling transport.
In NG-Flex configuration, each NG-RAN node is connected to all AMFs of AMF Sets within an AMF Region supporting at least one slice also supported by the NG-RAN node. The AMF Set and the AMF Region are defined in 3GPP TS 23.501 [3].
If security protection for control plane and user plane data on TNL of NG-RAN interfaces has to be supported, NDS/IP 3GPP TS 33.501 [13] shall be applied.

End 3GPP TS 38.401 V16.1.0, Section 6.1.1

The overall architecture for separation of the Control Plane (CP) part of the next generation Node B (gNB) Central Unit (CU), i.e., the gNB-CU-CP, and the User Plane (UP) part of the gNB-CU, i.e., gNB-CU-UP, is described in 3GPP TS 38.401 V16.1.0, Section 6.1.2, which is reproduced below.

Start 3GPP TS 38.401 V16.1.0, Section 6.1.2

The overall architecture for separation of gNB-CU-CP and gNB-CU-UP is depicted in FIG. 6.1.2-1.

Reproduced Herein as FIG. 2

FIG. 6.1.2-1. Overall Architecture for Separation of gNB-CU-CP and gNB-CU-UP

A gNB may consist of a gNB-CU-CP, multiple gNB-CU-UPs and multiple gNB-DUs;
  The gNB-CU-CP is connected to the gNB-DU through the F1-C interface;
  The gNB-CU-UP is connected to the gNB-DU through the F1-U interface;
  The gNB-CU-UP is connected to the gNB-CU-CP through the E1 interface;
  One gNB-DU is connected to only one gNB-CU-CP;
  One gNB-CU-UP is connected to only one gNB-CU-CP;
  NOTE 1: For resiliency, a gNB-DU and/or a gNB-CU-UP may be connected to multiple gNB-CU-CPs by appropriate implementation.
  One gNB-DU can be connected to multiple gNB-CU-UPs under the control of the same gNB-CU-CP;
  One gNB-CU-UP can be connected to multiple DUs under the control of the same gNB-CU-CP;

NOTE 2: The connectivity between a gNB-CU-UP and a gNB-DU is established by the gNB-CU-CP using Bearer Context Management functions.

NOTE 3: The gNB-CU-CP selects the appropriate gNB-CU-UP(s) for the requested services for the UE. In case of multiple CU-UPs they belong to same security domain as defined in TS 33.210 [18].

NOTE 4: Data forwarding between gNB-CU-UPs during intra-gNB-CU-CP handover within a gNB may be supported by Xn-U.

End 3GPP TS 38.401 V16.1.0, Section 6.1.2

Quality of Experience (QoE) measurements have been specified for Long Term Evolution (LTE) and Universal Mobile Telecommunications System (UMTS). The purpose of the application layer measurements is to measure the end user experience when using certain applications. Currently QoE measurements for streaming services and for Mobility Telephony Service for Internet Protocol (IP) Multimedia Subsystem (IMS), i.e., MTSI, services are supported.

The solutions in LTE and UMTS are similar with the overall principles as follows. QoE Measurement Collection enables configuration of application layer measurements in the User Equipment (UE) and transmission of QoE measurement result files by means of Radio Resource Control (RRC) signaling. Application layer measurement configuration received from Operations and Management (OAM) or the Core Network (CN) is encapsulated in a transparent container, which is forwarded to UE in a downlink RRC message. Application layer measurements received from UE's higher layer are encapsulated in a transparent container and sent to network in an uplink RRC message. The result container at forwarded to a Trace Collector Entity (TCE).

In 3GPP release 17, a new study item for "Study on NR QoE management and optimizations for diverse services" for NR has been approved. The purpose of the study item is to study solutions for QoE measurements in NR. QoE management in NR will not just collect the experience parameters of streaming services but also consider the typical performance requirements of diverse services (e.g. Augmented Reality (AR)/Virtual Reality (VR) and Ultra-Reliable Low-Latency Communication (URLLC)). Based on requirements of services, the NR study will also include more adaptive QoE management schemes that enable network intelligent optimization to satisfy user experience for diverse services.

The measurements may be initiated towards the Radio Access Network (RAN) in management-based manner, i.e. from an O&M node in a generic way, e.g., for a group of UEs, or they may also be initiated in a signaling-based manner, i.e. initiated from the Core Network (CN) to the RAN, e.g., for a single UE. The configuration of the measurement includes the measurement details, which is encapsulated in a container that is transparent to RAN.

When initiated via the core network, the measurement is started towards a specific UE. For the LTE case, the "TRACE START" S1AP message is used, which carries, among others, the details about the measurement configuration the application should collect (in the "Container for application layer measurement configuration" IE, transparent to the RAN) and the details to reach the trace collection entity to which the measurements should be sent.

The RAN is not aware of when the streaming session is ongoing in the UE Access Stratum and is also not aware of when the measurements are ongoing. When RAN stops the measurements is an implementation decision. Typically, it is done when the UE has moved outside the measured area.

One opportunity provided by the legacy solution is also to be able to keep the QoE measurement for the whole session, even during handover situation.

In regard to QoE measurements in the Universal Terrestrial Radio Access Network (UTRAN), according to 3GPP TS 25.331, the UTRAN can request the UE (via "UE Capability Enquiry") to report its capability via a UE capability enquire procedure, as shown in FIG. 3. The UE can provide its capability using the "UE Capability Information" RRC message as shown in FIG. 4. The "UE Capability Information" message can include the "UE radio access capability" (see excerpt below from 3GPP TS 25.331).

Start Excerpt from 3GPP TS 25.331 V16.0.0

| Information Element/ Group name | Need | Multi | Type and reference | Semantics description | Version |
|---|---|---|---|---|---|
| Measurement capability | OP | | Measurement capability 10.3.3.21 | | |

End Excerpt from 3GPP TS 25.331 V16.0.0

The "Measurement Capability" Information Element (IE) can be used from the UE to transfer to the UTRAN the information related to the capability to perform the QoE measurement collection for streaming services and/or MTSI services. Below an extract of the "Measurement Capability" from 3GPP TS 25.331.

Start Excerpt from 3GPP TS 25.331 V16.0.0

| Information Element/ Group name | Need | Multi | Type and reference | Semantics description | Version |
|---|---|---|---|---|---|
| QoE Measurement Collection for streaming services | CV-not_iRAT_HoInfo | | Enumerated (TRUE) | TRUE means that the UE supports QoE Measurement Collection for streaming services. | REL-14 |
| QoE Measurement Collection for MTSI services | CV-not_iRAT_HoInfo | | Enumerated (TRUE) | TRUE means that the UE supports QoE Measurement Collection for MTSI services. | REL-15 |

End Excerpt from 3GPP TS 25.331 V16.0.0

To configure QoE measurement in the UE, the UTRAN can send a "Measurement Control" RRC message containing "Application layer measurement configuration", as illustrated in FIG. 5. The content of the "Application layer measurement configuration" IE is represented in the table below.

| Information Element/ Group name | Need | Multi | Type and reference | Semantics description | Version |
|---|---|---|---|---|---|
| Container for application layer measurement configuration | MP | | Octet string (1 . . . 1000) | | REL-14 |
| Service type | MP | | Enumerated (QoEStreaming, QoEMTSI) | | REL-15 |

The UE can send QoE measurement results via UTRAN to the Collecting Entity using the "Measurement Report" RRC message and including the "Application layer measurement reporting" IE, as illustrated in FIG. 6. The UE may also perform Cell Update with cause "application layer measurement report available" in order to initiate the transfer of application layer measurement report.

Signaling radio bearer RB4 is used for the MEASUREMENT REPORT message carrying the IE "Application layer measurement reporting". The content of the "Application layer measurement reporting" IE is represented in the table below.

| Information Element/ Group name | Need | Multi | Type and reference | Semantics description | Version |
|---|---|---|---|---|---|
| Container for application layer measurement reporting | MP | | Octet string (1 . . . 8000) | | REL-14 |
| Service type | MP | | Enumerated (QoEStreaming, QoEMTSI) | | REL-15 |

Regarding QoE measurements in Evolved UTRAN (E-UTRAN), the UE capability transfer is used to transfer UE radio access capability information from the UE to E-UTRAN. FIG. 7 illustrates the UE capability transfer procedure in E-UTRAN. The UE-EUTRA-Capability IE is used to convey the Evolved Universal Terrestrial Radio Access (E-UTRA) UE Radio Access Capability Parameters and the Feature Group Indicators for mandatory features to the network. In the response message "UECapabilityInformation", the UE can include the "UE-EUTRA-Capability" IE. The "UE-EUTRA-Capability" IE may include the UE-EUTRA-Capability-v1530-IE which can be used by the UE to indicate whether the UE supports or not QoE Measurement Collection for streaming services and/or MTSI services, as detailed in the "MeasParameters-v1530" encoding below.

The contribution CR 4297 (R2-2004624) for 3GPP TS 36.331 v16.0.0 at the 3GPP TSG RAN2 Meeting #110 proposed an extension of the "UE-EUTRA-Capability" IE that, within the "UE-EUTRA-Capability-v16xy-IE", the UE-EUTRA-Capability IE may include a "measParameters-v16xy" comprising the qoe-Extensions-r16 IE. The qoe-Extensions-r16 IE may be used to indicate whether the UE supports the release 16 extensions for QoE Measurement Collection, i.e. if the UE supports more than one QoE measurement type at a time and if the UE supports the signaling of withinArea, session RecordingIndication, qoe-Reference, temporaryStopQoE, and restartQoE. This extension is shown below.

Start Extension from R2-2004624

```
MeasParameters-v1530 ::=            SEQUENCE {
    qoe-MeasReport-r15              ENUMERATED {supported}    OPTIONAL,
    qoe-MTSI-MeasReport-r15         ENUMERATED {supported}    OPTIONAL,
    ca-IdleModeMeasurements-r15     ENUMERATED {supported}    OPTIONAL,
    ca-IdleModeValidityArea-r15     ENUMERATED {supported}    OPTIONAL,
    heightMeas-r15                  ENUMERATED {supported}    OPTIONAL,
    multipleCellsMeasExtension-r15  ENUMERATED {supported}    OPTIONAL
}
MeasParameters-v16xy ::=            SEQUENCE {
    qoe-Extensions-r16                  ENUMERATED {supported}
    OPTIONAL
}
``` qoe-MeasReport
Indicates whether the UE supports QoE Measurement Collection for streaming services.
qoe-MTSI-MeasReport
Indicates whether the UE supports QoE Measurement Collection for MTSI services.
qoe-Extensions
Indicates whether the UE supports the release 16 extensions for QoE Measurement Collection, i.e. support of more than one QoE measurement type at a time and signalling of withinArea, sessionRecordingIndication, qoe-Reference, temporaryStopQoE and restartQoE.
temporaryStopQoE
Indicates that reporting, but not collection, of QoE measurements shall be temporarily stopped.
withinArea
The field indicates at handover, for each application layer measurement, whether the new cell is inside the area for the measurement, i.e. whether the UE is allowed to start new measurements in the cell.
restartQoE
Indicates that QoE measurements can be reported again after a temporary stop.

End Extension from R2-2004624

The QoE-Reference contains the parameter QoE Reference as defined in 3GPP TS 28.405 and shown below.

```
-- ASN1START
QoE-Reference-r16 ::=       SEQUENCE {
    plmn-Identity-r16       PLMN-Identity,
    qmc-Id-r16              OCTET STRING (SIZE (3) )
}
-- ASN1STOP
```

In regard to E-UTRAN application layer measurement reporting, the purpose of the "Application layer measurement reporting" procedure described in 3GPP TS 36.331 and shown in FIG. 8 is to inform E-UTRAN about application layer measurement report. A UE capable of application layer measurement reporting in RRC_CONNECTED may initiate the procedure when configured with application layer measurement, i.e. when measConfigAppLayer has been configured by E-UTRAN. Upon initiating the procedure, the UE shall:

1> if configured with application layer measurement, and SRB4 is configured, and the UE has received application layer measurement report information from upper layers:

the QoE measurements are being configured. Supported services are streaming and MTSI.

The contribution CR 4297 (R2-2004624) for 3GPP TS 36.331 v16.0.0 at the 3GPP TSG RAN2 Meeting #110 proposed to extend the QoE measurement configuration. The measConfigAppLayerToAddModList-r16 may be used to add or modify multiple QoE measurement configurations (up to maxQoE-Measurement-r16). The measConfigAppLayerToReleaseList-r16 IE may be used to remove multiple QoE measurement configuration (up to maxQoE-Measurement-r16). Below the details of the OtherConfig IE related to measConfigAppLayer-r15, measConfigAppLayerToAddModList-r16 and measConfigAppLayerToReleaseList-r16. The extension proposed in R2-2004624 is shown below.

Start Extension from R2-2004624

```
measConfigAppLayer-r15 CHOICE {
    release NULL,
    setup SEQUENCE {
        measConfigAppLayerContainer-r15 OCTET STRING (SIZE (1..1000)),
        serviceType-r15 ENUMERATED {qoe, qoemtsi, spare6,
            spare5, spare4, spare3, spare2, spare1}
    }
}
measConfigAppLayerToAddModList-r16 SEQUENCE
    (SIZE (1.. maxQoE-Measurement-r16)) OF MeasConfigAppLayer-r16
        OPTIONAL, -- Need ON
measConfigAppLayerToReleaseList-r16 SEQUENCE
    (SIZE (1.. maxQoE-Measurement-r16)) OF MeasReleaseAppLayer-r16
        OPTIONAL -- Need ON
MeasConfigAppLayer-r16 ::= SEQUENCE {
    measConfigAppLayerContainer-r15 OCTET STRING (SIZE(1 .. 1000)) OPTIONAL,
        -- Need ON
    serviceType-r16 ServiceType-r16 OPTIONAL, -- Need ON
    qoe-Reference-r16 OPTIONAL, -- Need ON
    withinArea-r16 ENUMERATED {inside, outside} OPTIONAL, -- Need ON
    temporaryStopQoE-r16 BOOLEAN,
    restartQoE-r16 BOOLEAN
}
MeasReleaseAppLayer-r16 ::= SEQUENCE {
    serviceType-r16 ServiceType-r16 OPTIONAL, -- Need ON
    qoe-Reference-r16 OPTIONAL -- Need ON
}
```

2> set the measReportAppLayerContainer in the MeasReportAppLayer message to the value of the application layer measurement report information;

2> set the serviceType in the MeasReportAppLayer message to the type of the application layer measurement report information;

2> submit the MeasReportAppLayer message to lower layers for transmission via SRB4.

In regard to E-UTRAN QoE measurement configuration setup and release, the RRCConnectionReconfiguration message is used to reconfigure the UE to setup or release the UE for Application Layer measurements. This is signaled in the measConfigAppLayer-15 IE within the "OtherConfig" IE. The setup includes the transparent container measConfigAppLayerContainer which specifies the QoE measurement configuration for the Application of interest and the serviceType IE to indicates the Application (or service) for which measConfigAppLayerContainer
The field contains configuration of application layer measurements, see Annex L (normative) in TS 26.247 and clause 16.5 in TS 26.114.
serviceType
Indicates the type of application layer measurement. Value qoe indicates Quality of Experience Measurement Collection for streaming services, value qoemtsi indicates Enhanced Quality of Experience Measurement Collection for MTSI.
measConfigAppLayerToAddModList
The field is used to setup or modify application layer measurements, see Annex L (normative) in TS 26.247 and clause 16.5 in TS 26.114.
measConfigAppLayerToReleaseList
The field is used to release application layer measurements, see Annex L (normative) in TS 26.247 and clause 16.5 in TS 26.114.

End Extension from R2-2004624

The ServiceType contains the service type of a certain QoE measurement as defined in TS 28.405 and shown below.

```
-- ASN1START
ServiceType-r16 ::=        ENUMERATED {qoe, qoemtsi, spare6, spare5, spare4,
                           spare3, spare2, spare1}
-- ASN1STOP
maxQoE-Measurement-r16   INTEGER ::= 8    -- Maximum number of QoE
Measurements
```

For E-UTRAN, an example of desired UE behavior at reception of the "OtherConfig" IE in the RRCReconfiguration message is described in CR 4297 (R2-2004624) as follows:
1> if the received otherConfig includes the measConfigAppLayerToAddModList:
2> for each serviceType and qoe-Reference included in the measConfigAppLayerToAddModList:
2> forward measConfigAppLayerContainer, qoe-Reference and serviceType to upper layers considering the serviceType;
2> consider itself to be configured to send application layer measurement report in accordance with 5.6.19;

RRC message is used by the UE to send to the E-UTRAN node the QoE measurement results of an Application (or service). The service for which the report is being sent is indicated in the "serviceType" IE.

The contribution CR 4297 (R2-2004624) for 3GPP TS 36.331 v16.0.0 at the 3GPP TSG RAN2 Meeting #110 proposed to extend the MeasReportAppLayer IEs introducing a QoE reference comprising the PLMN identity and the identifier of the QoE Measurement Collection Below the details for the MeasReportAppLayer message, sent using Signaling Radio Bearer, SRB4, are shown.

| MeasReportAppLayer message |
|---|
| ```
-- ASN1START
MeasReportAppLayer-r15 ::=                SEQUENCE {
    criticalExtensions                        CHOICE {
        measReportAppLayer-r15                    MeasReportAppLayer-r15-IEs,
        criticalExtensions Future                 SEQUENCE { }
    }
}
MeasReportAppLayer-r15-IEs ::=            SEQUENCE {
    measReportAppLayerContainer-r15           OCTET STRING (SIZE (1 .. 8000))
OPTIONAL,
    serviceType-r15                           ENUMERATED
        {qoe, qoemtsi, spare6, spare5, spare4, spare3, spare2, spare1}
OPTIONAL,
    nonCriticalExtension                      MeasReportAppLayer-v1590-IEs OPTIONAL
}
MeasReportAppLayer-v1590-IEs ::=          SEQUENCE {
    lateNonCriticalExtension                  OCTET STRING OPTIONAL,
    nonCriticalExtension                      SEQUENCE { } OPTIONAL
}
MeasReportAppLayer-v1590-IEs ::=          SEQUENCE {
    lateNonCriticalExtension                  OCTET STRING OPTIONAL
    nonCriticalExtension                      MeasReportAppLayer-IEs-v16xy
OPTIONAL
}
MeasReportAppLayer-IEs-v16xy :: =         SEQUENCE {
    qoe-Reference-r16                             OPTIONAL, -- Need ON
    recordingSessionIndication-r16                BOOLEAN OPTIONAL, -- Need ON
    nonCriticalExtension                          SEQUENCE { } OPTIONAL
}
-- ASN1STOP
``` |

2> forward withinArea to upper layers if received;
2> forward temporaryStopQoE to upper layers if received;
2> forward restartQoE to upper layers if received;
1> if the received otherConfig includes the measConfigAppLayerToReleaseList:
2> for each serviceType and qoe-Reference included in the measConfigAppLayerToReleaseList:
2> inform upper layers to clear the associated stored application layer measurement configuration;
2> discard received associated application layer measurement report information from upper layers;
2> consider itself not to be configured to send the associated application layer measurement report for that serviceType and qoe-Reference.

In regard to E-UTRAN QoE measurement reporting, as specified in 3GPP TS 36.331, the MeasReportAppLayer

| MeasReportAppLayer field descriptions |
|---|
| measReportAppLayerContainer<br>The field contains container of application layer measurements, see Annex L (normative) in TS 26.247 and clause 16.5 in TS 26.114.<br>serviceType<br>Indicates the type of application layer measurement. Value qoe indicates Quality of Experience Measurement Collection for streaming services, value qoemtsi indicates Quality of Experience Measurement Collection for MTSI.<br>qoe-Reference<br>Contains the reference of the application layer measurement.<br>recordingSessionIndication<br>Indicates that a recording of a session in the application layer has started. |

For E-UTRAN, an example of desired UE behavior for Application layer measurement reporting is described in CR 4297 (R2-2004624) as follows:

A UE capable of application layer measurement reporting in RRC_CONNECTED may initiate the procedure when configured with application layer measurement, i.e. when measConfigAppLayer has been configured by E-UTRAN.

Upon initiating the procedure, the UE shall:
1> if configured with application layer measurement, and SRB4 is configured, and the UE has received application layer measurement report information from upper layers:
2> set the measReportAppLayerContainer in the MeasReportAppLayer message to the value of the application layer measurement report information;
2> set the serviceType in the MeasReportAppLayer message to the type of the application layer measurement report information;
2> set the qoe-Reference in the MeasReportAppLayer message to the value received from upper layer;
2> set the recordingSessionIndication in the MeasReportAppLayer message to the value received from upper layer;
2> submit the MeasReportAppLayer message to lower layers for transmission via SRB4.

SUMMARY

Systems and methods are disclosed herein that relate to Quality of Experience (QoE) measurement configuration and reporting in a cellular communications system during mobility. In one embodiment, a method performed by a User Equipment (UE) comprises receiving a QoE measurement configuration and a measurement duration time associated to the QoE measurement configuration, starting to perform QoE measurements in accordance with the QoE measurement configuration, starting a measurement duration timer upon starting to perform the QoE measurements, the measurement duration timer being initialized to the measurement duration time associated to the QoE measurement configuration, and continuing to perform the QoE measurements while the measurement duration timer is running. In this manner, QoE measurements can be configured and performed without the risk of being stopped due to overwriting QoE measurement configurations, e.g., in the case of mobility.

In one embodiment, the method further comprises stopping performance of the QoE measurements upon expiration of the measurement duration timer.

In one embodiment, receiving the QoE measurement configuration and the measurement duration time associated to the QoE measurement configuration comprises receiving the QoE measurement configuration and the measurement duration time associated to the QoE measurement from a RAN node.

In one embodiment, receiving the QoE measurement configuration and the measurement duration time associated to the QoE measurement configuration comprises receiving the QoE measurement configuration from a RAN node and receiving the measurement duration time from an external system. In one embodiment, the method further comprises providing the measurement duration time to a RAN node.

In one embodiment, the method further comprises detecting presence of one or more conditions for pausing the QoE measurements and, upon detecting the presence of the one or more conditions, pausing the QoE measurements and pausing the measurement duration timer. In one embodiment, the one or more conditions for pausing the QoE measurements comprise: the UE moving to an inactive state, suspension of a service(s) for which QoE measurements need to be collected is(are) suspended, or occurrence of a period in which a respective session is ongoing but there is no uplink or downlink traffic being exchanged for the session for a predefined or preconfigured amount of time. In one embodiment, the method further comprises sending, to the RAN node, an indication that the measurement duration timer associated to the QoE measurement configuration has been paused. In one embodiment, the method further comprises detecting an end of the one or more conditions for pausing the QoE measurements and, upon detecting the end of the one or more conditions for pausing the QoE measurements, resuming the QoE measurements in accordance with the QoE measurement configuration and resuming the measurement duration timer. In one embodiment, the method further comprises sending, to a RAN node, an indication that the measurement duration timer associated to the QoE measurement configuration has resumed.

In one embodiment, the method further comprises sending, to the RAN node, an indication that the measurement duration timer has started upon starting the measurement duration timer.

In one embodiment, the method further comprises sending, to the RAN node, one or more indications that the QoE measurements are being performed while the measurement duration timer is running.

In one embodiment, the method further comprises sending, to a RAN node (1002), an indication that the measurement duration timer has expired upon expiration of the measurement duration timer.

In one embodiment, the method further comprises connecting to a second RAN node as a result of a handover procedure prior to expiration of the measurement duration timer. In one embodiment, the measurement duration timer continues to run during the handover procedure. In another embodiment, the measurement duration timer is paused prior to the handover procedure and resumed after the handover procedure. In one embodiment, the method further comprises providing, to the second RAN node during or immediately following the handover procedure, information that indicates that the UE has an active QoE measurement configuration. In one embodiment, the method further comprises providing, to the second RAN node during or immediately following the handover procedure, information that indicates a status or state of the measurement duration timer.

In one embodiment, the measurement duration timer runs continuously.

In one embodiment, the measurement duration timer runs only during time intervals when the UE is capable of performing the QoE measurements.

In one embodiment, the measurement duration timer runs only during time intervals when a measurement session that corresponds to the QoE measurements performed for the QoE measurement configuration is active.

Corresponding embodiments of a UE are also disclosed. In one embodiment, a UE is adapted to receive a QoE measurement configuration and a measurement duration time associated to the QoE measurement configuration, start to perform QoE measurements in accordance with the QoE measurement configuration, start a measurement duration timer upon starting to perform the QoE measurements, the measurement duration timer being initialized to the measurement duration time associated to the QoE measurement configuration, and continue to perform the QoE measurements while the measurement duration timer is running.

In another embodiment, a UE comprises one or more transmitters, one or more receivers, and processing circuitry associated to the one or more transmitters and the one or more receivers. The processing circuitry is configured to cause the UE to receive a QoE measurement configuration and a measurement duration time associated to the QoE measurement configuration, start to perform QoE measurements in accordance with the QoE measurement configuration, start a measurement duration timer upon starting to perform the QoE measurements, the measurement duration timer being initialized to the measurement duration time associated to the QoE measurement configuration, and continue to perform the QoE measurements while the measurement duration timer is running.

In one embodiment, a method performed by a first RAN node comprises sending, to a UE, a QoE measurement configuration and a measurement duration time associated to the QoE measurement configuration.

In one embodiment, the method further comprises receiving, from the UE, an indication that a measurement duration timer associated to the QoE measurement configuration has been paused. In one embodiment, the method further comprises receiving, from the UE, an indication that the measurement duration timer associated to the QoE measurement configuration has resumed.

In one embodiment, the method further comprises receiving, from the UE, an indication that the measurement duration timer has started.

In one embodiment, the method further comprises receiving, from the UE, one or more indications that the QoE measurements are being performed while the measurement duration timer is running at the UE.

In one embodiment, the method further comprises receiving, from the UE, an indication that the measurement duration timer has expired.

In one embodiment, the method further comprises initiating a handover of the UE to a second RAN node while the measurement duration timer is running. In one embodiment, initiating the handover comprises sending a handover request to the second RAN node, the handover request comprising the QoE measurement configuration of the UE, a modified QoE measurement configuration for the UE, an indication of whether the QoE or modified QoE measurement configuration has been activated at the UE, and/or information about a status or state of the measurement duration timer associated to the QoE measurement configuration. In one embodiment, the measurement duration timer continues to run during the handover procedure. In another embodiment, the measurement duration timer is paused prior to the handover and resumed after the handover.

In one embodiment, the measurement duration timer runs continuously. In another embodiment, the measurement duration timer runs only during time intervals when the UE is capable of performing the QoE measurements. In another embodiment, the measurement duration timer runs only during time intervals when a measurement session that corresponds to the QoE measurements performed for the QoE measurement configuration is active.

Corresponding embodiments of a first RAN node are also disclosed. In one embodiment, the first RAN node is adapted to send, to a UE, a QoE measurement configuration and a measurement duration time associated to the QoE measurement configuration.

In another embodiment, a first RAN node comprises processing circuitry configured to cause the RAN node to send, to a UE, a QoE measurement configuration and a measurement duration time associated to the QoE measurement configuration.

In one embodiment, a method performed by a second RAN node comprises receiving, in association with a handover of a UE from a first RAN node to the second RAN node, information that indicates whether the UE has an active QoE measurement configuration for which the UE is performing QoE measurements.

In one embodiment, receiving the information comprises receiving the information in association with a handover request from the first RAN node.

In one embodiment, receiving the information comprises receiving at least some of the information from the UE during the handover or immediately following the handover.

In one embodiment, the information comprises information about a status or state of a measurement duration timer associated to the active QoE measurement configuration of the UE.

In one embodiment, the method further comprises performing one or more actions based on the information. In one embodiment, performing the one or more actions comprises determining whether the UE has an activate QoE measurement configuration based on the information. In one embodiment, performing the one or more actions comprises refraining from configuring the UE with a conflicting QoE measurement configuration until the measurement duration timer for the active QoE measurement configuration has expired.

Corresponding embodiments of a second RAN node are also disclosed. In one embodiment, the second RAN node is adapted to receive, in association with a handover of a UE from a first RAN node to the second RAN node, information that indicates whether the UE has an active QoE measurement configuration for which the UE is performing QoE measurements.

In one embodiment, a second RAN node comprises processing circuitry configured to cause the second RAN node to receive, in association with a handover of a UE from a first RAN node to the second RAN node, information that indicates whether the UE has an active QoE measurement configuration for which the UE is performing QoE measurements.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
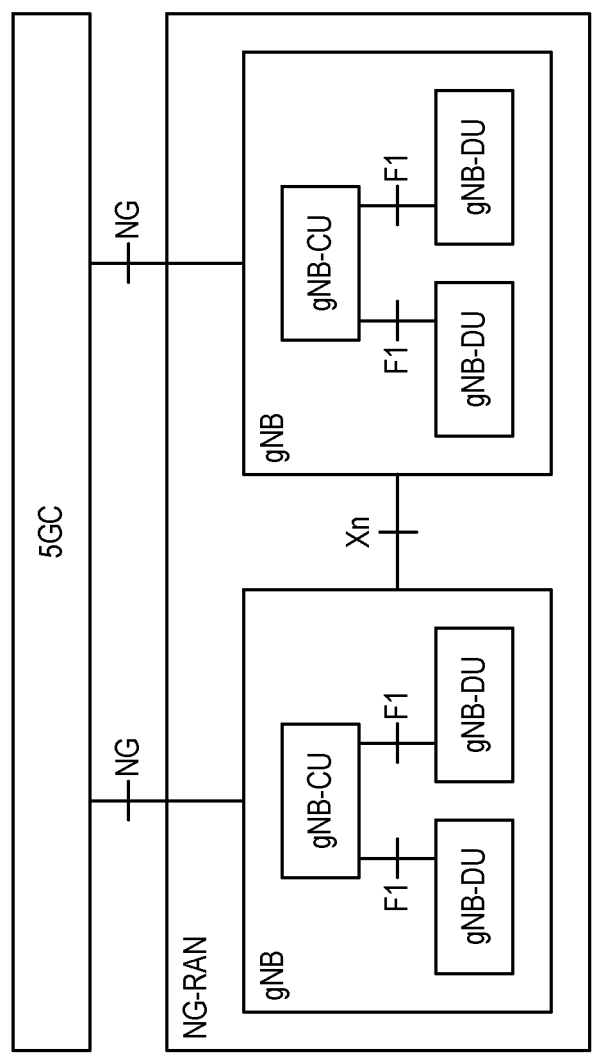
FIG. 1 is a reproduction of FIGS. 6.1-1 of Third Generation Partnership Project (3GPP) Technical Specification (TS) 38.401 V16.1.0.
Figure 2:
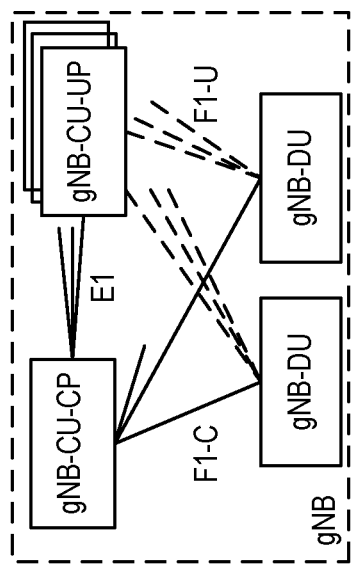
FIG. 2 is a reproduction of FIG. 6.1.2-1 of 3GPP TS 38.401 V16.1.0.
Figure 4:
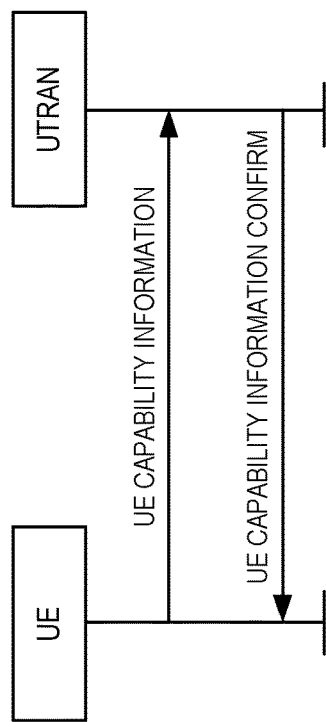
FIG. 4 illustrates that a UE can provide its capability regarding application layer measurements via the UE Capability Information Radio Resource Control (RRC) message.
Figure 3:
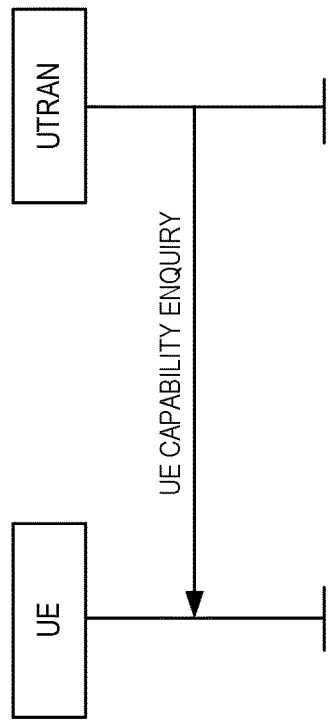
FIG. 3 illustrates the User Equipment (UE) capability enquire procedure in a Universal Terrestrial Radio Access Network (UTRAN), as specified in 3GPP TS 25.331.
Figure 6:
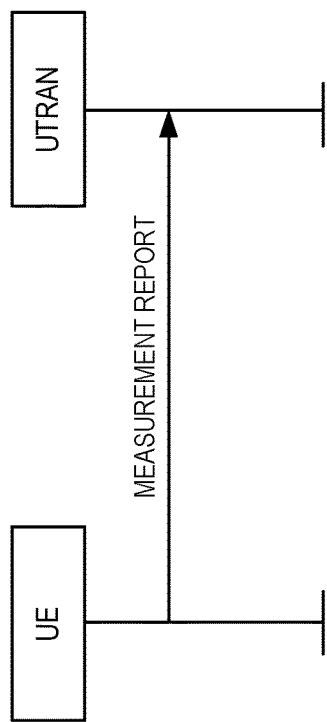
FIG. 6 illustrates how the UE can send a QoE measurement report via UTRAN to a Collecting Entity using the "Measurement Report" RRC message and including the "Application layer measurement reporting" Information Element (IE)
Figure 5:
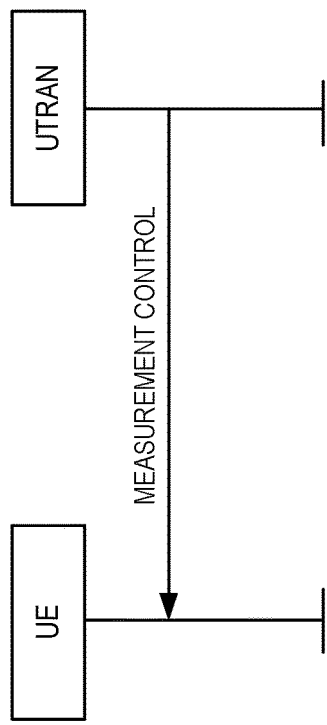
FIG. 5 illustrates how the UTRAN can send a Quality of Experience (QoE) measurement configuration via RRC signaling using the "Measurement Control" RRC message containing "Application layer measurement configuration"
Figure 8:
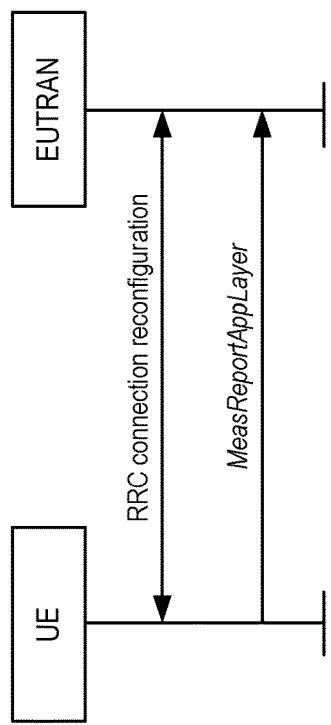
FIG. 8 illustrates how application layer measurement reporting is performed in E-UTRAN.
Figure 7:
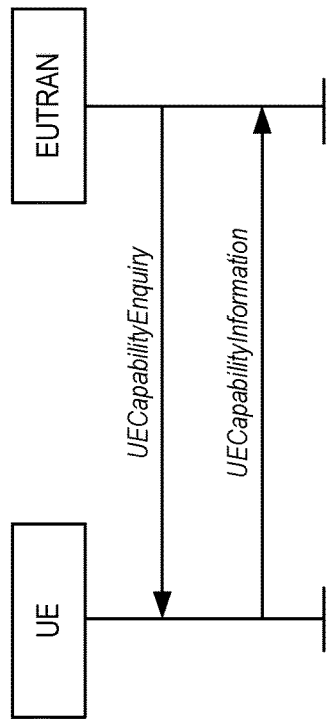
FIG. 7 illustrates the UE capability transfer procedure in Evolved UTRAN (E-UTRAN)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" or "RAN node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a gNB-DU, a gNB-CU, a gNB-CU-CP, a gNB-CU-UP, a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). One problem identified for the existing solution for Quality of Experience (QoE) measurement configuration and reporting is the limited support of QoE configuration management during mobility. In particular, using the existing solution, it is not possible to control the duration for the QoE measurement process from the RAN. Also, it is not possible during UE mobility to transfer an indication to the target RAN node of whether the UE is configured with a QoE measurement collection process and for how long such configuration will last or for how long it has lasted. Further, after an inter-node handover, there is a risk that the target RAN node attempts to configure the UE for QoE measurements while the UE already has an active QoE measurement configuration and cannot support another one, at least not the particular QoE measurement configuration conveyed from the target RAN node. Conversely, another risk is that the target RAN node postpones a QoE measurement configuration, even though the UE is ready to receive one.

Certain aspects of the present disclosure and their embodiments may provide solutions to the aforementioned or other challenges. For the sake of simplicity, the description provided herein takes the 5GS and in particular the New Radio (NR) RAN (i.e., the NG-RAN) into account for the formulation of the embodiments of the solution described herein. Thus, when the term "RAN node" is used in the description, this is typically a gNB, or a gNB-CU (where "CU" stands for "Central Unit"), or a gNB-DU (where "DU" stands for "Distributed Unit"). However, the person skilled will realize that the embodiments of the solution described herein are also applicable to other systems where QoE measurements are configured at a mobile device and collected by the serving communication network. Such other systems could for example be the LTE system, in which case the term "RAN node" would refer to an eNB.

In one embodiment of the present disclosure, a UE is configured by the RAN with a QoE measurement configuration duration. Such a duration is monitored using a timer that is configured by the RAN and which indicates for how long the UE is to perform QoE measurements.

In one embodiment, the timer is paused, and thus the QoE measurements are paused, when one or more conditions are satisfied. The one or more conditions for which the timer is paused may include, for example:
 when the UE moves to an inactive state (e.g., RRC_INACTIVE state), or
 when a service(s) for which QoE measurements need to be collected is(are) suspended, or
 when a long period of "silence" occurs during the application session (i.e., the session is ongoing, but there is no uplink (UL) or downlink (DL) data traffic being exchanged between the UE and the network for an extended period of time, where the extended period of time is, e.g., a predefined amount of time or preconfigured amount of time).

In one embodiment, once the condition(s) for pausing the timer no longer exists, the UE resumes the timer, and thus the QoE measurements.

As an example, the QoE measurements are suspended, and thus the timer paused, when the UE is subject to a Radio Link Failure (RLF), or when the RAN is in an overload state, and the bearer(s) transporting traffic for the service(s) for which QoE measurements need to be collected is(are) suspended until the UE is able to resume Data Radio Bearer (DRB) traffic. Once the UE is able to resume the DRB traffic, the QoE measurements and the timer are resumed.

In another example, the timer is paused because the UE is entering an area where the QoE measurements are not allowed or not configured to be taken. The timer can then be resumed when the UE enters an area where the QoE measurements are allowed to be taken or are configured to be taken. Such area could for example be made of a set of cells, Tracking Areas, or Public Land Mobile Networks (PLMNs). In yet another example, the timer can be paused during the execution of a handover.

In another embodiment, the timer is never paused. In yet another embodiment, the RAN configures whether the timer should be paused/suspended while QoE measurement samples cannot be collected (e.g., for the above described reasons) or continue running. In an extension of this embodiment, the RAN configures the timer behavior (pause/resume or no pause) per case of QoE measurement sample collection prohibition (e.g., separately for the case of RLF and the case of RRC_INACTIVE state).

In another embodiment, the timer is set to zero (implicitly or explicitly) to indicate the end of the validity period for a QoE measurement configuration currently in use.

In one embodiment, the timer may be provided to the RAN by an external system(s), such as for example the Operations and Management (OAM) system or the core network (e.g., a node in the core network, such as the AMF). In one embodiment, the timer is provided to the RAN together with QoE measurement configuration (e.g., prior to finding the UEs that satisfy the measurement criteria, similar to management based QoE in LTE). In another embodiment, the timer is provided to the RAN from an external system, for a particular UE, after the UE in question starts QoE measurement. The timer can be provided to the RAN in a manner that is readable for the RAN node (i.e., as an Information Element (IE) readable by the RAN node), or it can be provided to the RAN by the UE, after the UE has received it from an external system.

In another embodiment, when the UE moves from a source RAN node to a target RAN node, the source RAN node signals to target RAN node the QoE measurement configuration together with a timer that indicates the remaining time duration until the QoE process is completed. In addition to such information the source RAN may signal to target RAN whether the QoE configuration has been activated at the UE or whether it has not been provided to the UE. Reasons why the configuration may not have been provided to the UE are that the UE has moved to inactive state before the configuration could be signaled to the UE or because the need for the handover became so crucial that the configuration of QoE measurements in the UE was downprioritized and delegated to the target RAN node.

In one embodiment, the target RAN node determines from the QoE measurement configuration and timer information received from the source RAN node whether the UE is still engaged in a QoE measurement collection process or whether the UE is not engaged in such a process (or such processes) and can therefore be configured with a new QoE measurement configuration. In another embodiment, the target RAN node determines from the information received from source RAN node that the QoE measurement configuration transferred from the source RAN node has not been provided to the UE and therefore it needs to be signaled to the UE.

In another embodiment, the RAN keeps track of the time the UE is configured with QoE measurements and releases the QoE measurements if they last too long or due to a long period of inactivity (e.g., lack of UL and DL traffic exchange) during an ongoing session. If the UE performs a handover while configured with QoE measurements, the elapsed or remaining time that the UE has been configured with QoE measurements is transferred to the target node, so that the target node can continue the counting.

Certain embodiments may provide one or more of the following technical advantage(s). The embodiments in this disclosure allow for QoE measurements to be configured and performed without the risk of being stopped due to overwriting QoE measurement configurations. This would make it possible for the RAN to control the duration of the QoE measurement process. The RAN is enabled to know when the UE will be ready for a new QoE measurement configuration without interrupting previously configured ones because the UE will not report QoE measurement once the configuration period has expired.

The embodiments disclosed herein may allow for efficient management of QoE measurement configuration during mobility, ensuring that all the information needed to configure the UE with appropriate QoE measurement processes are provided to the target RAN node.

Figure 9:
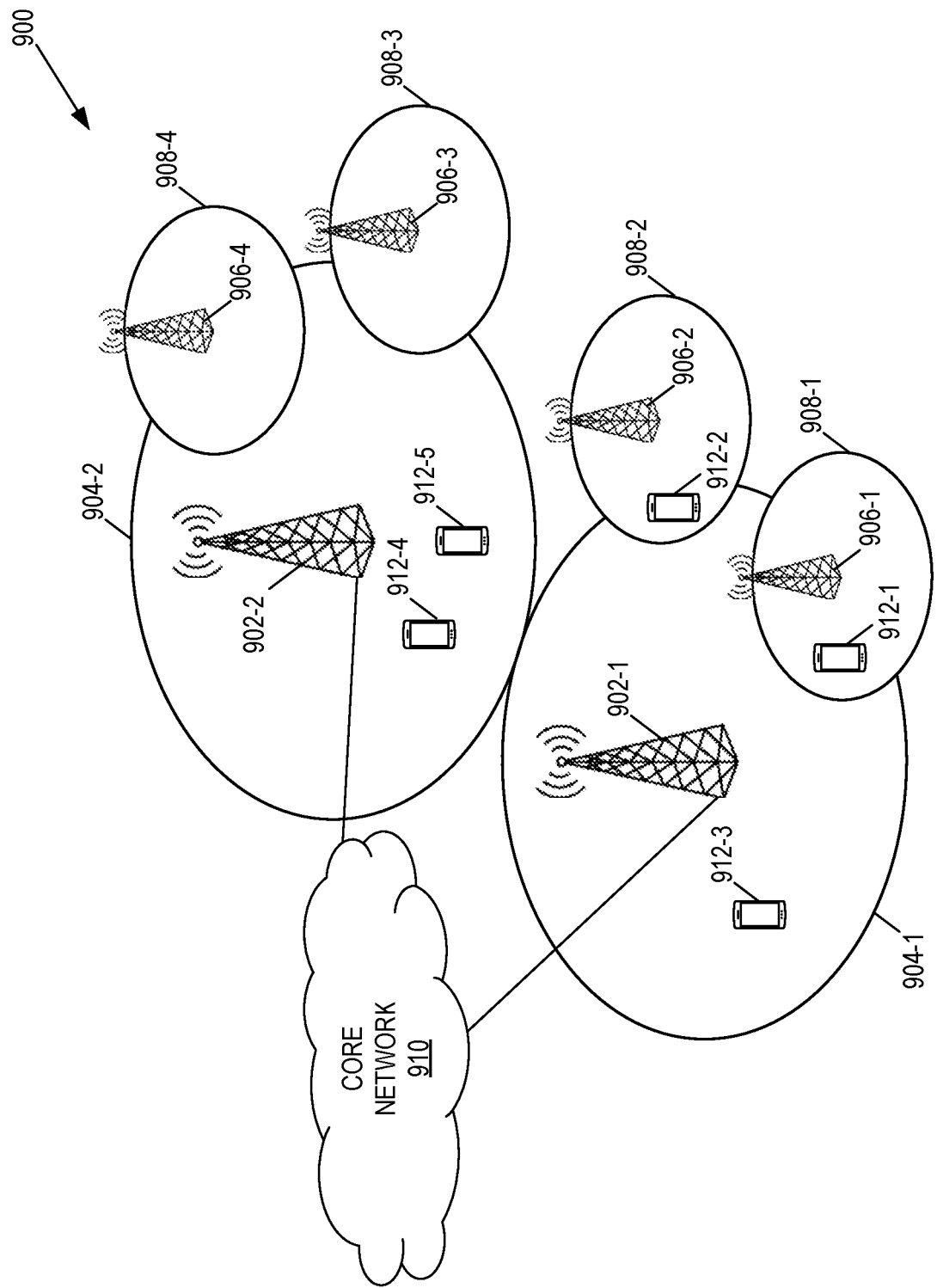
FIG. 9 illustrates one example of a cellular communications system in which embodiments of the present disclosure may be implemented.

FIG. 9 illustrates one example of a cellular communications system 900 in which embodiments of the present disclosure may be implemented. In the embodiments described herein, the cellular communications system 900 is a 5G system (5GS) including a Next Generation RAN (NG-RAN) and a 5G Core (5GC); however, the present disclosure is not limited thereto. The embodiments described herein are equally applicable to other types of systems in which QoE measurements are performed such as, e.g., an Evolved Packet System (EPS) including an Evolved Universal Terrestrial RAN (E-UTRAN) and an Evolved Packet Core (EPC). In this example, the RAN includes base stations 902-1 and 902-2, which in the 5GS include NR base stations (gNBs) and optionally next generation eNBs (ng-eNBs), controlling corresponding (macro) cells 904-1 and 904-2. The base stations 902-1 and 902-2 are generally referred to herein collectively as base stations 902 and individually as base station 902. Likewise, the (macro) cells 904-1 and 904-2 are generally referred to herein collectively as (macro) cells 904 and individually as (macro) cell 904. The RAN may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The cellular communications system 900 also includes a core network 910, which in the 5G System (5GS) is referred to as the 5GC. The base stations 902 (and optionally the low power nodes 906) are connected to the core network 910.

The base stations 902 and the low power nodes 906 provide service to wireless communication devices 912-1 through 912-5 in the corresponding cells 904 and 908. The wireless communication devices 912-1 through 912-5 are generally referred to herein collectively as wireless communication devices 912 and individually as wireless communication device 912. In the following description, the wireless communication devices 912 are oftentimes UEs and as such sometimes referred to herein as UEs 912, but the present disclosure is not limited thereto.

Figure 10A:
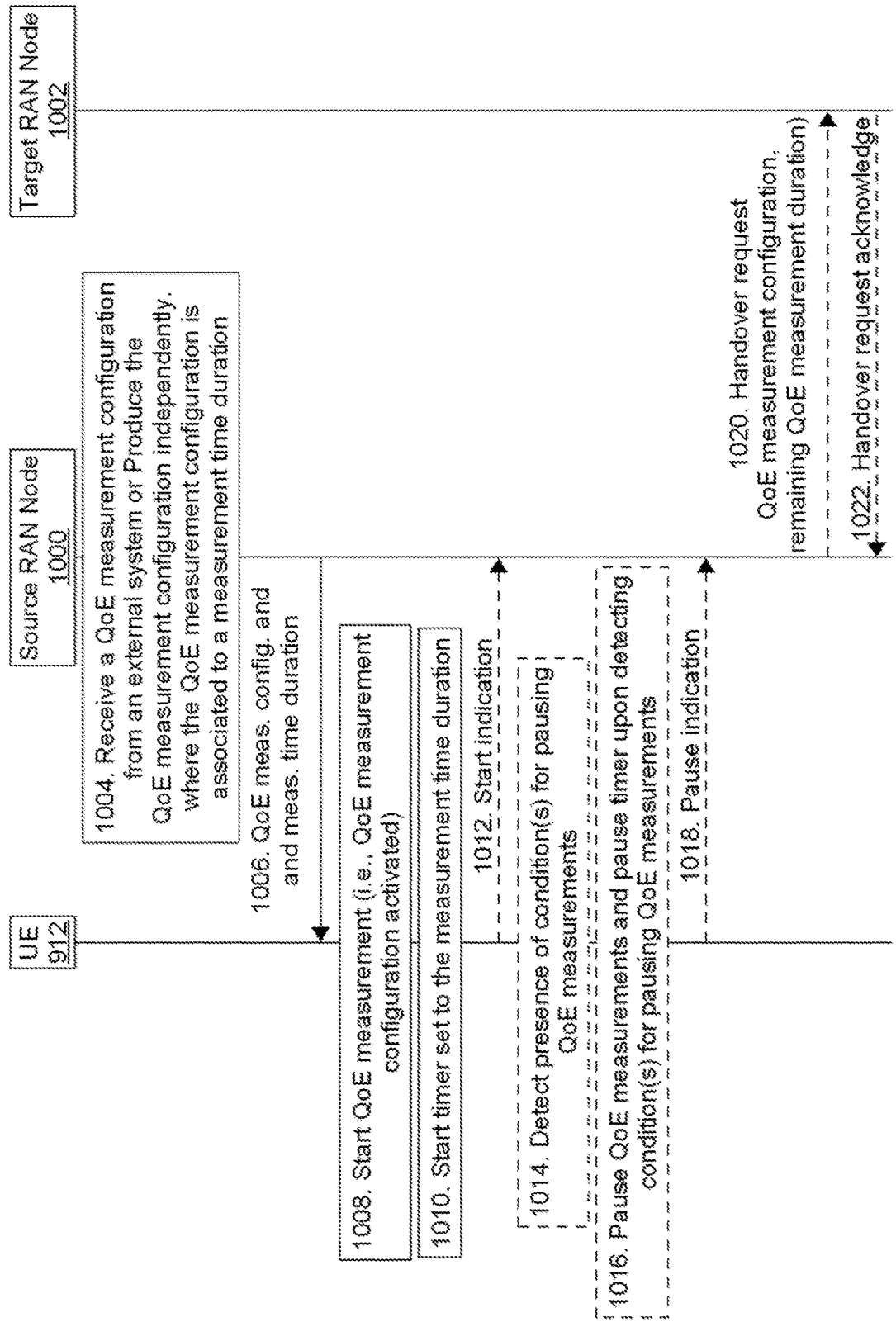
FIGS. 10A and 10B illustrate the operation of a serving/source Radio Access Network (RAN) node, a target RAN node, and a UE in accordance with some embodiments of the present disclosure.
Figure 10B:
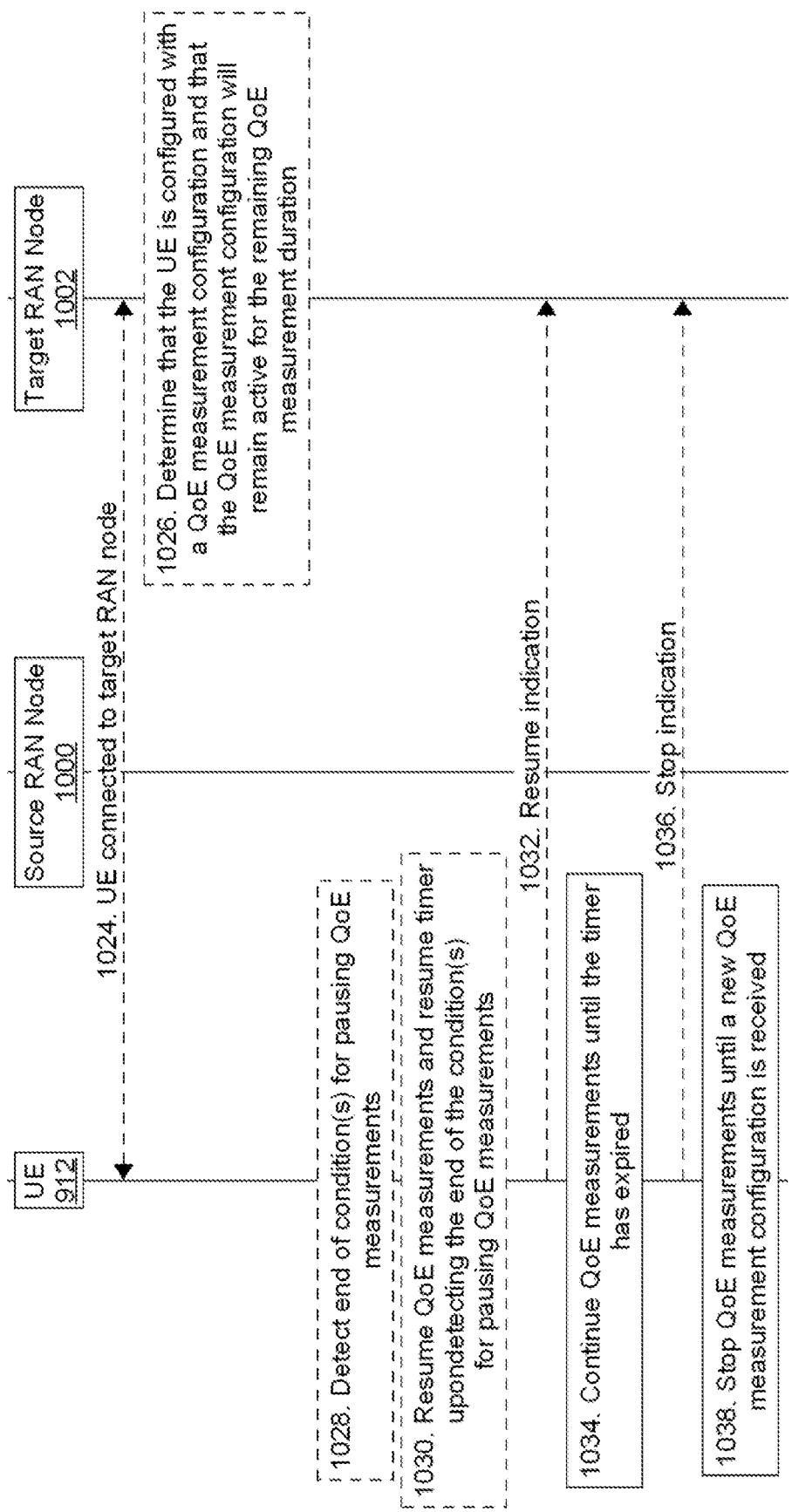

FIGS. 10A and 10B illustrate the operation of a serving/source RAN node 1000, a target RAN node 1002, and a UE 912 in accordance with some embodiments of the present disclosure. The serving/source RAN node 1000 can be, for example, a first base station 902 (e.g., a first gNB) or a network node that provides some of the functionality of a first base station 902 (e.g., a first gNB-CU or a first gNB-DU), and the target RAN node 1000 can be, for example, a second base station 902 (e.g., a second gNB) or a network node that provides some of the functionality of a base station (e.g., a second gNB-CU or a second gNB-DU). The steps of the process of FIG. 10 are described below. Optional steps are represented in FIGS. 10A and 10B by dashed lines/boxes.

Step 1004: The serving RAN node 1000, which may later become the source RAN node 1000 in the case of a handover, obtains a QoE measurement configuration for the UE 912. The QoE measurement configuration may be either received from an external system (e.g., OAM or a core network node) or produced by the serving RAN node 1000, e.g., independently. The QoE measurement configuration is associated with a measurement time duration (i.e., a timer value). The measurement time duration is a time duration expressed, e.g. in seconds, during which the UE is to collect, or perform, QoE measurements. In one embodiment, the measurement time duration can be provided to the serving RAN node 1000 together with QoE measurement configuration (e.g., prior to finding the UEs that satisfy the measurement criteria, similar to management based QoE in LTE). In another embodiment, the measurement timer duration is provided to the serving RAN node 1000 from an external system, for the particular UE 912, after the UE 912 in question starts QoE measurement. The measurement time duration can be provided to the serving RAN node 1000 in a manner that is readable for the serving RAN node 1000 (i.e., as an IE readable by the serving RAN node 1000), or it can be provided to the serving RAN node 1000 by the UE 912, after the UE 912 has received it from an external system.

The time during which measurements can be collected might either be measured continuously, i.e. without interruptions, or it might be measured only during intervals when the UE is capable of collecting QoE measurements or during the intervals that the measured session is active. For example, the time can be measured during time intervals when the UE 912 is in an area where QoE measurements are allowed to be collected, or during a time interval when the services for which QoE measurements have to be taken are active.

Step 1006: The serving RAN node 1000 sends one or more messages to the UE 912 that configure the UE 912 with the QoE measurement configuration and the measurement time duration for associated QoE measurements. The measurement time duration may, in some embodiments, be part of the QoE measurement configuration. The QoE measurement configuration and the measurement time duration may, for example, be conveyed to the UE 912 in an RRCReconfiguration message. The UE 912 will stop measurement collection for the QoE measurement configuration when the measurement time duration has expired.

Figure 16:
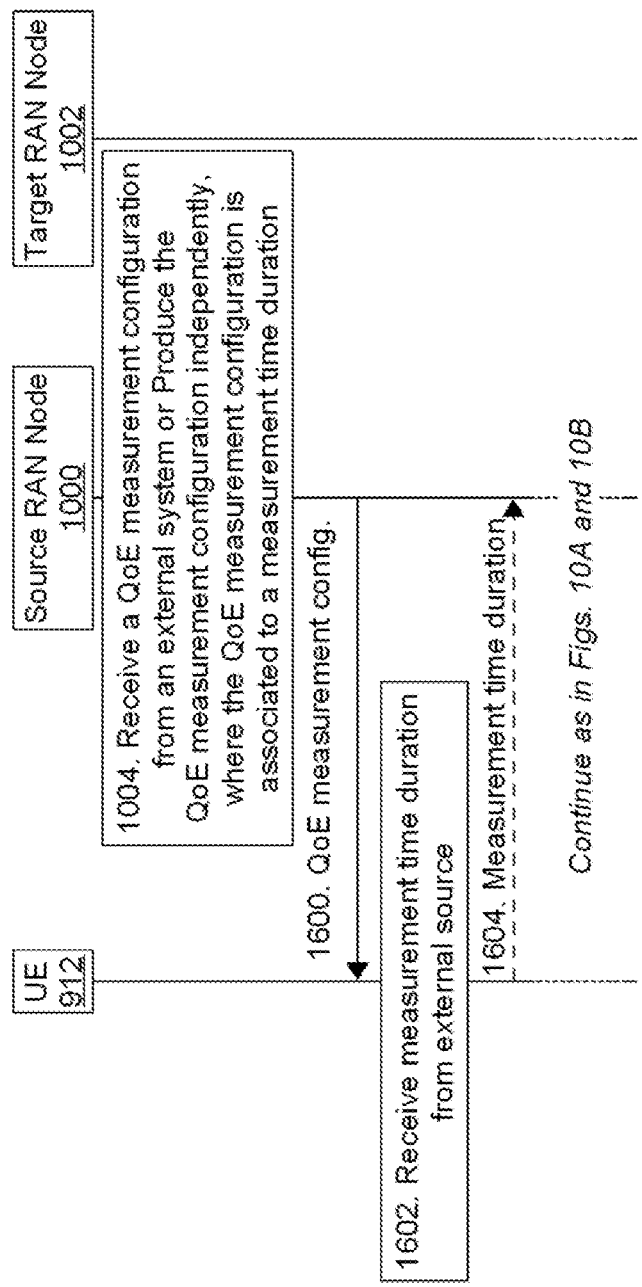
FIG. 16 illustrates an embodiment in which the measurement time duration associated to a QoE measurement configuration can be provided to the serving RAN node by the UE after the UE has received the measurement time duration from an external system.

In an alternative embodiment, the measurement time duration can be provided to the serving RAN node 1000 by the UE 912, after the UE 912 has received the measurement time duration from an external system. This is illustrated in FIG. 16, where as an alternative to step 1006, the serving RAN node 1000 sends one or more messages to the UE 912 that configure the UE 912 with the QoE measurement configuration (step 1600). The UE 912 receives the measurement time duration for the associated QoE measurements from an external system (step 1602) and may send the measurement time duration to the serving RAN node 1000 (step 1604).

Returning to FIGS. 10A and 10B, in a variant of step 1006, for a previously configured QoE measurement configuration with a non-zero remaining time duration, a zero measurement time duration (implicitly or explicitly) may be provided to indicate the end of the validity period of the QoE measurement configuration in use.

Steps 1008 and 1010: The UE 912 starts performing QoE measurements in accordance with the QoE measurement configuration and starts a timer set to the provided measurement time duration. This timer is sometimes referred to herein as a measurement duration timer.

Step 1012 (Optional): The UE 912 signals to the RAN (e.g., to the serving RAN node 1000) when the measurement duration timer is started (i.e., when the configured QoE measurements start).

Figure 17:
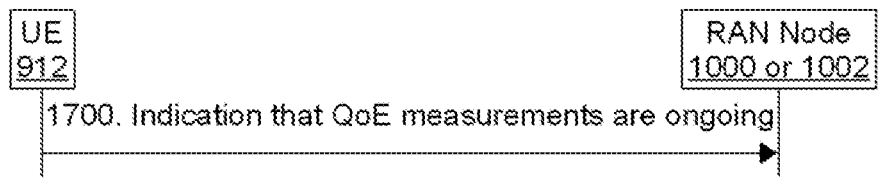
FIG. 17 illustrates an embodiment in which the UE signals to the RAN an indication that QoE measurement are in the process of being taken.

In one embodiment, as illustrated in FIG. 17, the UE 912 signals to the RAN (e.g., to the serving RAN node 1000 or to the target RAN node 1002 in the case of handover) an indication, either periodically or at the occurrence of specific procedures, that QoE measurements are in the process of being taken (step 1700). This allows the RAN to know that the UE 912 is engaged in an active QoE measurement collection activity and this might prevent the RAN from re-configuring the UE 912 with a new QoE measurement configuration or with any configuration that might prevent correct completion of the ongoing measurement process.

Now, the description returns to FIGS. 10A and 10B.

Steps 1014-1018 (Optional): In some embodiments, the UE 912 detects one or more conditions for pausing QoE measurements (see, e.g., the description in Section 5 ("Brief Summary of Some Aspects of the Proposed Solutions") of the Introduction above for details regarding example conditions for pausing QoE measurements). Upon detecting the condition(s) for pausing QoE measurements, in some embodiments, the UE 912 pauses the QoE measurements and the measurement duration timer (1016). Further, in some embodiments, upon pausing the measurement duration timer, the UE 912 signals an indication to the RAN (e.g., to the serving RAN node 1000) that the measurement duration timer is paused.

Steps 1020 and 1022 (Optional): In this step, the source RAN node 1000 decides to hand over the UE 912 to the target RAN node 1002. During handover preparation (Step 1020/Step 1022), the source RAN node 1000 signals to the target RAN node 1002 information about the QoE measurement configuration associated to the UE 912. This information may be included as part of the handover request.

Additionally, or as a part of the QoE measurement configuration information, the source RAN node 1000 may signal to the target RAN node 1002 the remaining measurement time duration for the UE 912. As a further option, the source RAN node 1000 may also include in the signaling to the target RAN node 1002 an indication of when the configured QoE measurements were started or for how long the configured QoE measurements have been ongoing.

In one embodiment, the remaining QoE measurement time duration may be derived by the RAN.

In another embodiment, the remaining QoE measurement time duration may be provided to the source RAN node 1000 by the UE 912 during previous signaling or to the target RAN node 1002 by the UE 912 during handover-related signaling or signaling (e.g., RRC signaling) immediately after the handover.

As part of the HO preparation, the source RAN node 1000 may inform the target RAN node 1002 of whether the QoE measurement configuration has been activated at the UE 912 or whether this has not been activated and it needs to be signaled to the UE 912. The source RAN node 1000 may indicate to the target RAN node 1002, e.g., via a flag (e.g., a binary flag), whether the QoE measurement configuration is activated for the UE 912 or not and possibly an indication of what type of QoE measurement is activated (e.g., for streaming service).

In one embodiment, the bearer configuration for the bearer serving a service consumed by the UE 912 may be modified when the UE 912 moves to the target RAN node 1002. As an example, if the source and target RAN nodes 1000 and 1002 belong to different RATs, the UE 912 might be using a bearer configuration in the source RAN node 912 that allows for a richer service content, while the target RAN node 1002 may be only able to provide a bearer that, for the same service, is able to offer lower amounts of resources and QoS. Such different configuration between source and target bearers may require a different QoE measurement configuration. For this reason, either the source RAN node 1000 or the target RAN node 1002 may decide to modify the QoE measurement configuration accordingly. Moreover, if the bearers for the measured session are not accepted at the target RAN node 1002, the source RAN node 1000 may decide to stop and terminate the QoE measurement at the UE 912.

If the source RAN node 1000 modifies the QoE measurement configuration, the source RAN node 1000 provides such configuration to the target RAN node 1002 once modified, but source RAN node 1000 signals to the target RAN node 1002 that the configuration is a modification of a currently ongoing configuration.

If the target RAN node 1002 modifies the QoE measurement configuration, the target RAN node 1002 provides such configuration to the UE 912 as a modification to the ongoing QoE measurement configuration, e.g. in the Handover Command (e.g., in the RRC configuration to be applied in the target cell). In both cases, the RAN node (source or target) may inform the external entity that produced the QoE measurement configuration that the configuration is updated.

Step 1024 (Optional): In this step, the UE 912 is connected to the target RAN node 1002 and the configured QoE measurement is ongoing at the UE 912.

Step 1026 (Optional): In this step, the target RAN node 1002 is determines, based on the information received from the source RAN node 1000 and/or based on information received from the UE 912 during the handover, that the UE 912 is configured with the ongoing QoE measurement configuration and also know the remaining measurement time duration at the UE 912.

Steps 1028-1032 (Optional): In embodiments in which QoE measurements and the measurement duration timer were paused (in step 1016), the UE 912 detects that the condition(s) for pausing QoE measurements are no longer present (i.e., detects that handover is complete and QoE measurements can resume in this example). Upon detecting that QoE measurements can be resumed, the UE 912 resumes QoE measurements in accordance with the QoE measurement configuration (or modified version thereof resulting from the handover) and resumes the measurement duration timer (1030). Optionally, the UE 912 sends an indication to the RAN (e.g., to the target RAN node 1002 in this example) that the measurement duration timer has resumed.

Step 1034: The UE 912 continues performing the QoE measurements until the measurement duration timer has expired.

Step 1036 (Optional): In some embodiments, the UE 912 sends an indication to the RAN (e.g., to the target RAN node 1002, which is now the serving RAN node after handover) that the measurement duration timer has expired.

Step 1038: The UE 912 stops QoE measurements once the measurement duration timer has expired and until a new QoE measurement configuration is received.

Under the assumption that the target RAN node 1002 is aware of how the UE 912 calculates the QoE measurement configuration elapsed time and under the assumption that the target RAN node 1002 is able to maintain the same elapsed time count as the UE 912, the target RAN node 1002 can assume that the UE 912 has released the QoE measurement configuration once the measurement time duration has expired. At this point in time, the target RAN node can re-configure the UE 912 with a new QoE measurement configuration without the risk of overwriting an existing configuration.

As an alternative, the target RAN node 912 may receive an explicit indication from the UE 912 of when the QoE measurement time duration has expired (see, e.g., step 1036).

As an alternative, regardless of whether the initially set QoE measurement time duration has expired, the target RAN node 1000 may receive (e.g., from the UE 912) a remaining time duration set to zero (or a missing remaining timer duration implicitly meaning that ongoing QoE measurement collection has to be stopped) which will prepare the UE 912 to accept a new QoE measurement configuration.

In one embodiment, the UE 912 discards the QoE measurement configuration when its associated measurement duration timer expires.

In another embodiment, the UE 912 keeps the QoE measurement configuration even after its associated measurement duration timer has expired, e.g., so that the RAN can refer to it and restart/reactivate it, optionally configuring a new duration timer for it, at a later point in time.

In yet another embodiment, the RAN can configure whether the UE 912 should discard or keep the QoE measurement configuration when its associated measurement duration timer expires.

In embodiments where the UE 912 keeps the QoE measurement configuration even when its associated measurement duration timer has expired, the UE 912 may later discard the QoE measurement configuration upon receiving an explicit instruction from the RAN to do so, or possibly when the UE 912 for other reasons is prevented from keeping the QoE measurement configuration, e.g. due to shortage of memory or because a maximum allowed number of stored QoE measurement configurations is exceeded.

An alternative solution is that the network controls the time of the QoE measurements. The RAN node (e.g., gNB) starts a timer when a UE is configured with QoE measurements. If the UE is configured too long with QoE measurements, or if the periods of session inactivity are too long, the RAN node may decide to release the measurements to avoid the UE from sending too large reports. If the UE performs a handover while being configured with QoE measurements, the source RAN node may transfer the time when the QoE measurements started or the elapsed time of the QoE measurements to the target RAN node, so that target RAN node may continue the measuring of the time.

The information about the start time or elapsed time may, e.g., be included in HANDOVER REQUEST message, see also TS 38.423.

Figure 18:
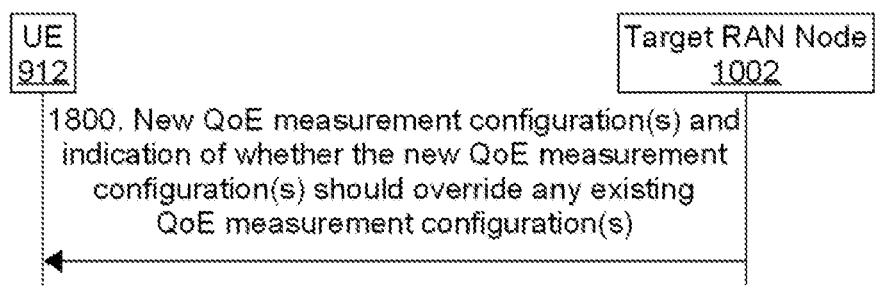
FIGS. 18, 19, 20, 21, 22, and 23 illustrate various embodiments related to the operation of the target RAN node in association of a handover of a UE that involves QoE measurement configurations.

A description of further embodiments related to actions in the target RAN node 1002 in conjunction with a handover or after handover will now be described. In one embodiment, as illustrated in FIG. 18, the target RAN node 1002 sends one or more new QoE measurement(s) configuration(s) and indicates whether the new configuration(s) should override any existing QoE measurement configuration (step 1800). This may be indicated per application (i.e., a QoE measurement configuration for one application may or may not be replaced by a new QoE measurement configuration for the same application) or for existing configuration(s) in general (i.e., in case "override" is indicated, this means that the new QoE measurement configuration(s) override and replace all existing QoE measurement configuration(s).

Figure 19:
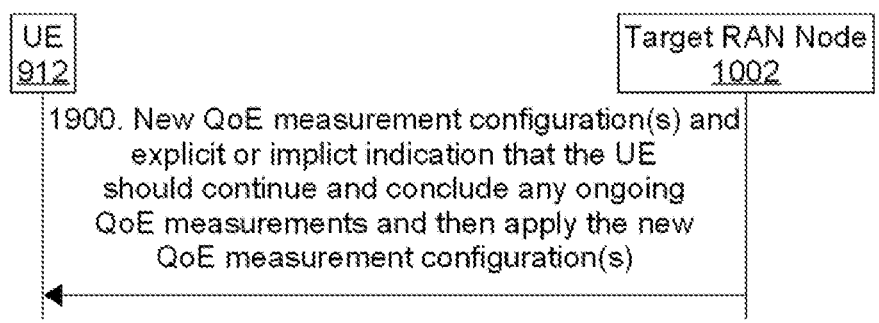

In one embodiment, as illustrated in FIG. 19, the target RAN node 1002 sends one or more new QoE measurement (s) and indicates, explicitly or implicitly, that the UE 912 should continue and conclude any ongoing QoE measurement (in general, i.e. all ongoing QoE measurement(s)) or for a concerned application, e.g. indicated per application) and then apply the new configuration (i.e. the further execution of the existing QoE measurement configuration is unaffected by the transfer of the new QoE measurement configuration) (step 1900). Herein, conclusion of an ongoing QoE measurement may involve continuing until a planned end, e.g. when a duration timer expires, or continuing until a certain event (marking conclusion of the QoE measurement) occurs, such as the end of the measured application session or exit of an area configured for the QoE measurement.

Figure 20:
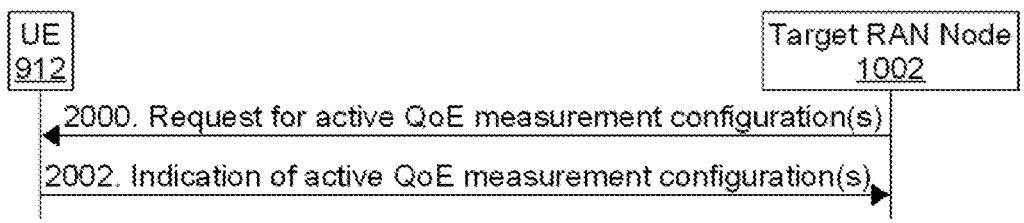

In one embodiment, as illustrated in FIG. 20, the target RAN node 1002 requests the UE 912 to indicate all active QoE measurement configuration(s) (step 2000). The UE 912 responds with information that indicates the active QoE measurement configuration(s) at the UE 912 (step 2002). This information may indicate that the UE 912 has an active QoE measurement configuration. The information may also, in one embodiment, indicate a status or state of the measurement duration timer associated to the active QoE measurement configuration. The target RAN node 1002 may then base its further actions on the information received from the UE 912, e.g. whether or not to send one or more QoE measurement configuration(s) to the UE 912 and whether such QoE measurement(s) (if sent) should override any ongoing QoE measurement(s) or be applied after the conclusion of any ongoing QoE measurement(s), or if/how new QoE measurement(s) sent to the UE 912 should be merged with existing QoE measurement configuration(s). In a variation of this embodiment, the target RAN node 1002 requests to know active QoE measurement configuration(s) for a certain application (or certain applications).

Figure 21:
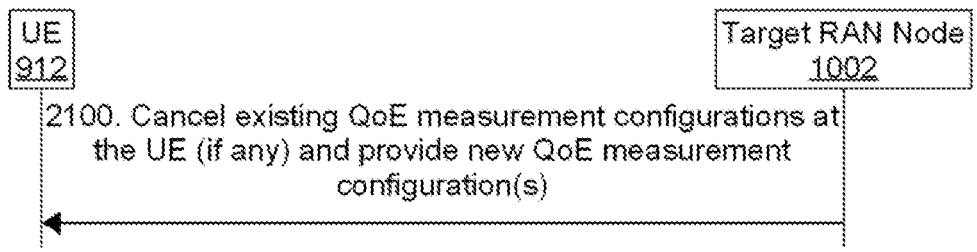

In one embodiment, as illustrated in FIG. 21, the target RAN node 1002 cancels all existing QoE measurement configuration(s) (if any) in the UE 912 and sends one or more new QoE measurement configuration(s) to the UE 912 (step 2100). This may be signaled and indicated per application or for applications.

Figure 22:
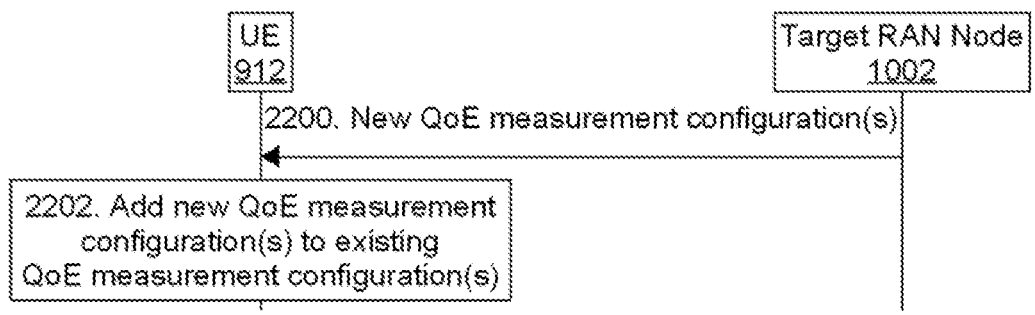

In one embodiment, as illustrated in FIG. 22, the target RAN node 1002 sends a QoE measurement configuration which, if the UE 912 already has a QoE measurement configuration for the concerned application, is added to the existing QoE measurement configuration (steps 2200 and 2202). In a variation of this embodiment, in case anything in the new QoE measurement configuration is in conflict with the existing one, the existing QoE measurement configuration has precedence and only non-conflicting parts of the new QoE measurement configuration are added. In another variation, in case anything in the new QoE measurement configuration is in conflict with the existing one, the new QoE measurement configuration has precedence (and in addition, non-conflicting parts of the new QoE measurement configuration are added to the existing QoE measurement configuration for the application).

Figure 23:
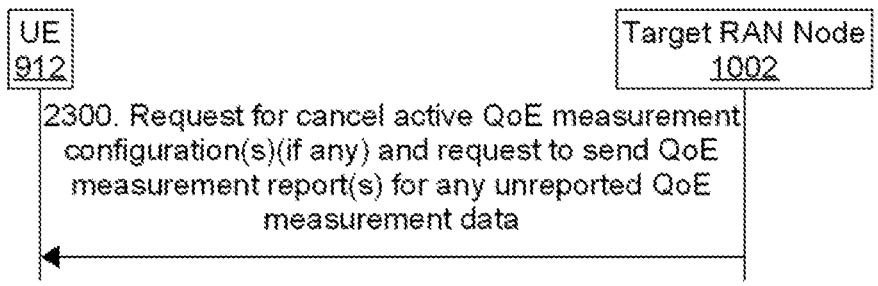

In one embodiment, as illustrated in FIG. 23, the target RAN node 1002 cancels all existing QoE measurement configuration(s) (if any) in the UE 912 and requests the UE 912 to send QoE measurement report(s) based on any yet unreported QoE measurement data, i.e. all the remaining unreported collected data, up until the cancellation, should be reported (step 2300).

In one embodiment, the target RAN node 1002 configures a duration timer for ongoing QoE measurements (one timer for all ongoing QoE measurement(s) or one timer per on going QoE measurement, e.g. measured per application).

For each and any of the above described embodiments, one variant of the embodiment is that the target RAN node does not receive any of the previously described QoE configuration related information from the source RAN node, or receives only parts of it. As another variant, the target RAN node may receive the previously described QoE measurement configuration related information from the source RAN node, or may receive relevant parts of it, and the target RAN node performs the above-described actions of this embodiment only when it does not receive said QoE measurement configuration related information nor relevant parts of it from the source RAN node. As yet another variant, the target RAN node may receive the previously described QoE measurement configuration related information from the source RAN node, or may receive relevant parts of it, and the target RAN node performs the above-described actions of this embodiment irrespective of any QoE measurement related information received from the source RAN node.

Figure 11:
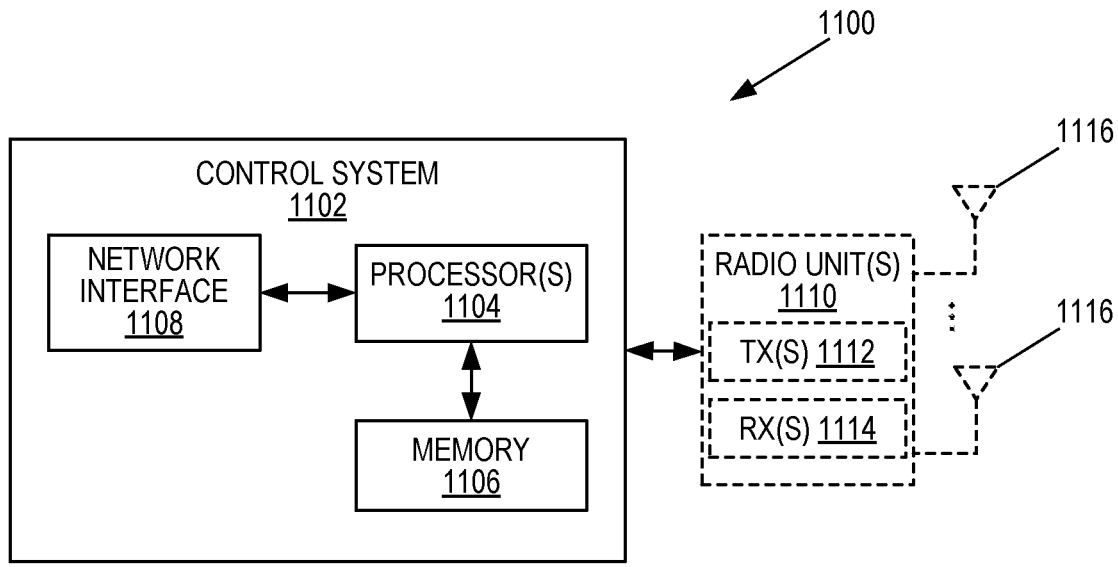
FIGS. 11, 12, and 13 are schematic block diagrams of example embodiments of a RAN node.

FIG. 11 is a schematic block diagram of a RAN node 1100 according to some embodiments of the present disclosure. Optional features are represented by dashed boxes. The RAN node 1100 may be, for example, a base station 902 or 906 or a network node that implements all or part of the functionality of the base station 902 or gNB described herein. As illustrated, the RAN node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the RAN node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of the RAN node 1100 as described herein (e.g., one or more functions of the serving/source RAN node or the target RAN, e.g., with respect to FIGS. 10A and 10B). In some embodiments, the function(s) are implemented in software that is stored, e.g., in the memory 1106 and executed by the one or more processors 1104.

Figure 12:
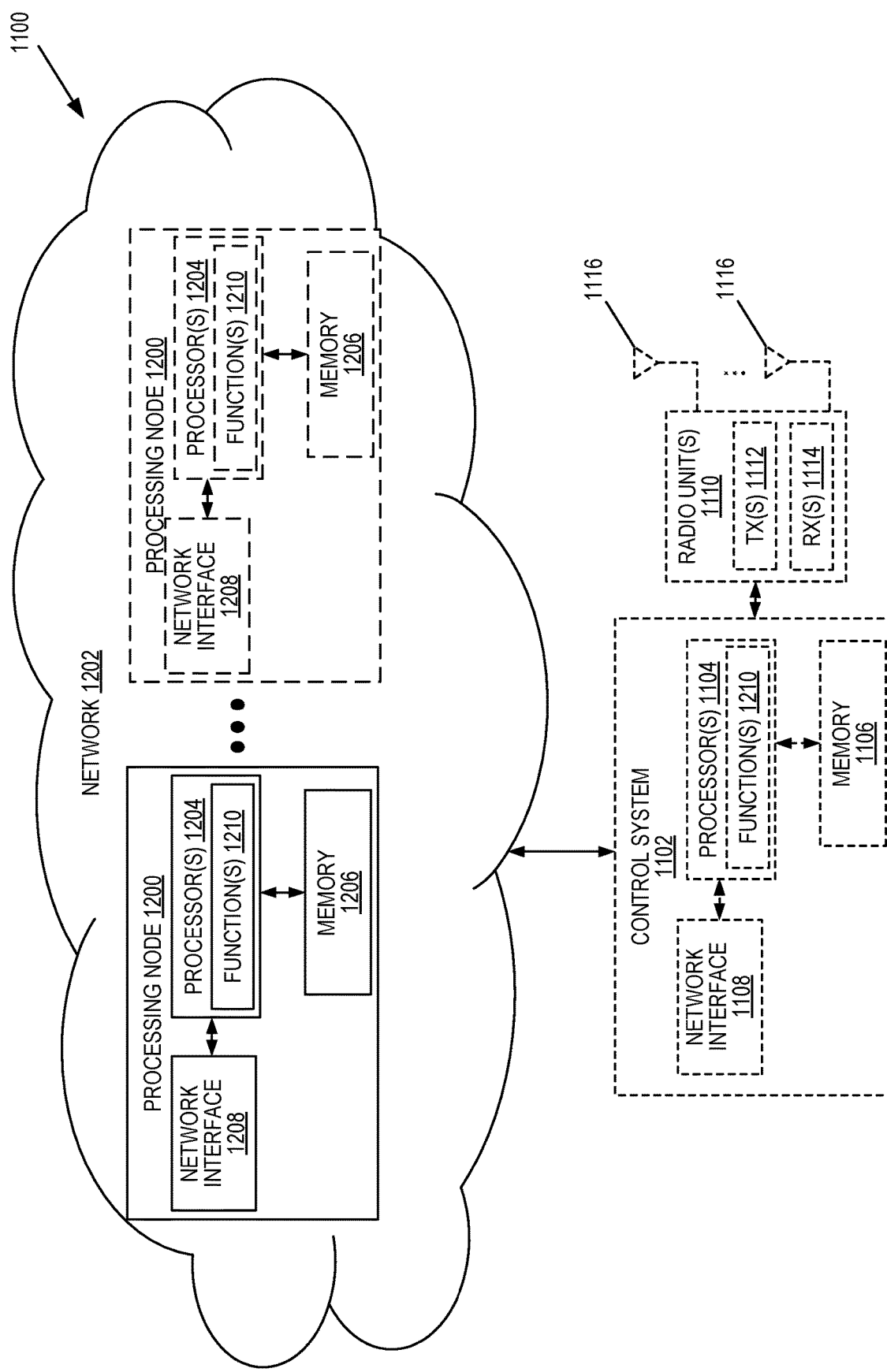

FIG. 12 is a schematic block diagram that illustrates a virtualized embodiment of the RAN node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" RAN node is an implementation of the RAN node 1100 in which at least a portion of the functionality of the RAN node 1100 is implemented as a virtual component(s) (e.g., via a virtual machine(s) executing on a physical processing node(s) in a network(s)). As illustrated, in this example, the RAN node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the RAN node 1100 described herein (e.g., one or more functions of the serving/source RAN node or the target RAN, e.g., with respect to FIGS. 10A and 10B) are implemented at the one or more processing nodes 1200 or distributed across the one or more processing nodes 1200 and the control system 1102 and/or the radio unit(s) 1110 in any desired manner. In some particular embodiments, some or all of the functions 1210 of the RAN node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of the RAN node 1100 or a node (e.g., a processing node 1200) implementing one or more of the functions 1210 of the RAN node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
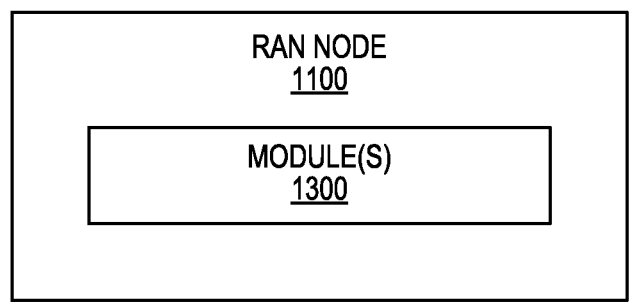

FIG. 13 is a schematic block diagram of the RAN node 1100 according to some other embodiments of the present disclosure. The RAN node 1100 includes one or more modules 1300, each of which is implemented in software. The module(s) 1300 provide the functionality of RAN node 1100 described herein (e.g., one or more functions of the serving/source RAN node or the target RAN, e.g., with respect to FIGS. 10A and 10B). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
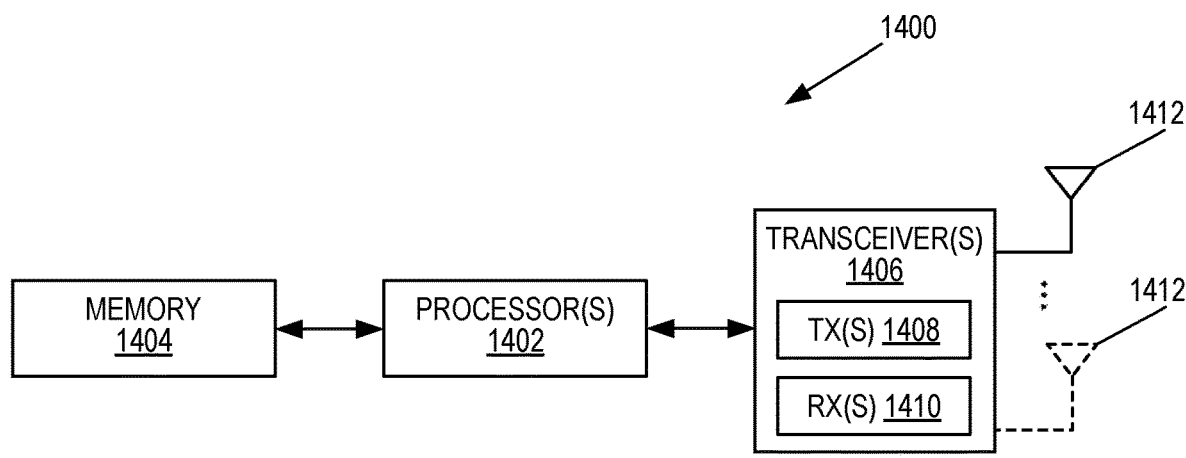
FIGS. 14 and 15 are schematic block diagrams of example embodiments of a UE.

FIG. 14 is a schematic block diagram of a wireless communication device 1400 (e.g., a UE or terminal device) according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above (e.g., one or more functions of the UE described above, e.g., with respect to FIGS. 10A and 10B) may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein (e.g., one or more functions of the UE described above, e.g., with respect to FIGS. 10A and 10B) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
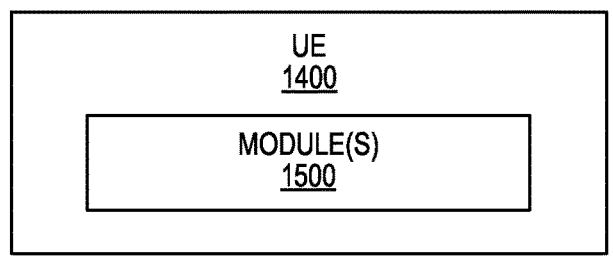

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein (e.g., one or more functions of the UE described above, e.g., with respect to FIGS. 10A and 10B).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method performed by a User Equipment, UE, the method comprising:
   receiving a Quality of Experience, QoE, measurement configuration and a measurement duration time associated to the QoE measurement configuration;
   starting to perform QoE measurements in accordance with the QoE measurement configuration;
   starting a measurement duration timer upon starting to perform the QoE measurements, the measurement duration timer being initialized to the measurement duration time associated to the QoE measurement configuration;
   continuing to perform the QoE measurements while the measurement duration timer is running; and
   sending, to a Radio Access Network, RAN, node, an indication that the measurement duration timer has expired upon expiration of the measurement duration timer.

2. The method of claim 1 further comprising stopping performance of the QoE measurements upon expiration of the measurement duration timer.

3. The method of claim 1 wherein receiving the QoE measurement configuration and the measurement duration time associated to the QoE measurement configuration comprises receiving the QoE measurement configuration and the measurement duration time associated to the QoE measurement from the RAN node.

4. The method of claim 1 wherein receiving the QoE measurement configuration and the measurement duration time associated to the QoE measurement configuration comprises:
   receiving the QoE measurement configuration from the RAN node; and
   receiving the measurement duration time from an external system.

5. The method of claim 4 further comprising providing the measurement duration time to the RAN node.

6. The method of claim 1 further comprising:
   detecting presence of one or more conditions for pausing the QoE measurements; and
   upon detecting the presence of the one or more conditions:
      pausing the QoE measurements; and
      pausing the measurement duration timer.

7. The method of claim 6 wherein the one or more conditions for pausing the QoE measurements comprise: the UE moving to an inactive state, suspension of a service(s) for which QoE measurements need to be collected is (are) suspended, or occurrence of a period in which a respective session is ongoing but there is no uplink or downlink traffic being exchanged for the session for a predefined or preconfigured amount of time.

8. The method of claim 6 further comprising sending, to the RAN node, an indication that the measurement duration timer associated to the QoE measurement configuration has been paused.

9. The method of claim 6 further comprising:
   detecting an end of the one or more conditions for pausing the QoE measurements; and
   upon detecting the end of the one or more conditions for pausing the QoE measurements:
      resuming the QoE measurements in accordance with the QoE measurement configuration; and
      resuming the measurement duration timer.

10. The method of claim 9 further comprising sending, to the RAN node, an indication that the measurement duration timer associated to the QoE measurement configuration has resumed.

11. The method of claim 1 further comprising sending, to the RAN node, an indication that the measurement duration timer has started upon starting the measurement duration timer.

12. The method of claim 1 further comprising sending, to the RAN node, one or more indications that the QoE measurements are being performed while the measurement duration timer is running.

13. The method of claim 1 further comprising connecting to a second RAN node as a result of a handover procedure prior to expiration of the measurement duration timer.

14. The method of claim 13 wherein the measurement duration timer continues to run during the handover procedure.

15. The method of claim 13 wherein the measurement duration timer is paused prior to the handover procedure and resumed after the handover procedure.

16. The method of claim 13 further comprising providing, to the second RAN node during or immediately following the handover procedure, information that indicates that the UE has an active QoE measurement configuration.

17. The method of claim 13 further comprising providing, to the second RAN node during or immediately following the handover procedure, information that indicates a status or state of the measurement duration timer.

18. A User Equipment, UE, adapted to:
   receive a Quality of Experience, QoE, measurement configuration and a measurement duration time associated to the QoE measurement configuration;
   start to perform QoE measurements in accordance with the QoE measurement configuration;
   start a measurement duration timer upon starting to perform the QoE measurements, the measurement duration timer being initialized to the measurement duration time associated to the QoE measurement configuration;
   continue to perform the QoE measurements while the measurement duration timer is running; and
   send, to a Radio Access Network, RAN, node, an indication that the measurement duration timer has expired upon expiration of the measurement duration timer.

* * * * *